US009739470B2

(12) United States Patent
Boomgaarden et al.

(10) Patent No.: US 9,739,470 B2
(45) Date of Patent: Aug. 22, 2017

(54) LOW PROFILE LIGHT AND ACCESSORY KIT FOR THE SAME

(71) Applicant: Lightning Science Group Corporation, Satellite Beach, FL (US)

(72) Inventors: Mark Penley Boomgaarden, Satellite Beach, FL (US); Michael Balestracci, Satellite Beach, FL (US); Rick LeClair, Melbourne, FL (US); Wei Sun, Indialantic, FL (US); David Henderson, Indialantic, FL (US); Shane Sullivan, Indialantic, FL (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 177 days.

(21) Appl. No.: 14/492,348

(22) Filed: Sep. 22, 2014

(65) Prior Publication Data

US 2015/0092421 A1 Apr. 2, 2015

Related U.S. Application Data

(63) Continuation of application No. 14/134,884, filed on Dec. 19, 2013, now Pat. No. 8,967,844, which is a (Continued)

(51) Int. Cl.
*B60Q 1/00* (2006.01)
*F21V 29/77* (2015.01)
(Continued)

(52) U.S. Cl.
CPC .............. *F21V 29/773* (2015.01); *F21K 9/20* (2016.08); *F21K 9/62* (2016.08); *F21K 9/64* (2016.08);
(Continued)

(58) Field of Classification Search
CPC ..... F21S 8/04; F21S 8/06; F21S 8/033; F21V 21/02; F21V 21/04; F21V 29/004; F21V 29/713; F21Y 2101/02; F21Y 2105/001
(Continued)

(56) References Cited

U.S. PATENT DOCUMENTS 5,738,436 A 4/1998 Cummings et al.
6,161,910 A 12/2000 Reisenauer et al.
(Continued)

FOREIGN PATENT DOCUMENTS

EP 1950491 A1 7/2008
WO 2008137732 A1 11/2008

OTHER PUBLICATIONS

European International Search Report for Application No. 10174449.8; Dated Dec. 14, 2010.
(Continued)

*Primary Examiner* — Ali Alavi
(74) *Attorney, Agent, or Firm* — Mark Malek; Daniel Pierron; Widerman Malek, PL

(57) ABSTRACT

A luminaire includes a light source having a plurality of light emitting diodes (LEDs), a heat spreader, and a substantially ring-shaped trim plate. The heat spreader is disposed between and in thermal communication with the light source and the trim plate such that the heat spreader facilitates transfer of heat from the LEDs to the trim plate. The trim plate is structurally configured and disposed for dissipating heat generated by the light source. The trim plate has an outer dimension that is larger than: an opening defined by a nominally sized can light fixture; and, an opening defined by a nominally sized electrical junction box.

16 Claims, 17 Drawing Sheets

Related U.S. Application Data continuation of application No. 13/476,388, filed on May 21, 2012, now Pat. No. 8,672,518, which is a continuation-in-part of application No. 12/775,310, filed on May 6, 2010, now Pat. No. 8,201,968.

(60) Provisional application No. 61/248,665, filed on Oct. 5, 2009.

(51) Int. Cl.

| | |
|---|---|
| ***F21S 8/02*** | (2006.01) |
| ***F21S 8/04*** | (2006.01) |
| ***F21V 29/00*** | (2015.01) |
| ***F21V 23/00*** | (2015.01) |
| ***F21V 29/70*** | (2015.01) |
| ***F21S 8/00*** | (2006.01) |
| ***F21V 29/71*** | (2015.01) |
| ***F21V 7/00*** | (2006.01) |
| ***F21V 23/02*** | (2006.01) |
| ***F21K 9/20*** | (2016.01) |
| ***F21K 9/62*** | (2016.01) |
| ***F21K 9/64*** | (2016.01) |
| ***F21V 17/00*** | (2006.01) |
| *F21V 21/02* | (2006.01) |
| *F21V 21/04* | (2006.01) |
| *F21Y 101/00* | (2016.01) |
| *F21Y 105/10* | (2016.01) |
| *F21Y 115/10* | (2016.01) |

(52) U.S. Cl.

CPC ............... *F21S 8/026* (2013.01); *F21S 8/033* (2013.01); *F21S 8/04* (2013.01); *F21V 7/0066* (2013.01); *F21V 17/007* (2013.01); *F21V 21/047* (2013.01); *F21V 23/00* (2013.01); *F21V 23/026* (2013.01); *F21V 29/004* (2013.01); *F21V 29/22* (2013.01); *F21V 29/2212* (2013.01); *F21V 29/70* (2015.01); *F21V 29/713* (2015.01); *F21V 21/02* (2013.01); *F21V 21/04* (2013.01); *F21Y 2101/00* (2013.01); *F21Y 2105/10* (2016.08); *F21Y 2115/10* (2016.08)

(58) Field of Classification Search

USPC .................................................. 362/294, 547

See application file for complete search history.

(56) References Cited

U.S. PATENT DOCUMENTS

| | | | | |
|---|---|---|---|---|
| 6,168,299 | B1 | 1/2001 | Yan | |
| 6,431,728 | B1 | 8/2002 | Fredericks et al. | |
| 6,561,690 | B2 | 5/2003 | Balestriero et al. | |
| 6,616,291 | B1 | 9/2003 | Love | |
| 6,719,446 | B2 | 4/2004 | Cao | |
| 6,786,625 | B2 | 9/2004 | Wesson | |
| 6,799,864 | B2 | 10/2004 | Bohler et al. | |
| 7,102,172 | B2 | 9/2006 | Lynch et al. | |
| 7,125,146 | B2 | 10/2006 | Willis et al. | |
| 7,250,637 | B2 | 7/2007 | Shimizu et al. | |
| 7,320,965 | B2 | 1/2008 | Sah et al. | |
| 7,360,925 | B2 | 4/2008 | Coushaine | |
| 7,413,321 | B2 | 8/2008 | Kim | |
| 7,540,761 | B2 * | 6/2009 | Weber | F21V 23/06 313/317 |
| 7,547,112 | B2 | 6/2009 | Kim | |
| 7,607,812 | B2 | 10/2009 | Kim | |
| 7,670,021 | B2 * | 3/2010 | Chou | F21S 8/026 362/147 |
| 7,722,220 | B2 | 5/2010 | Van De Ven | |
| 7,722,227 | B2 * | 5/2010 | Zhang | F21S 8/026 362/147 |
| 7,810,960 | B1 * | 10/2010 | Soderman | F21K 9/00 362/249.02 |
| 7,828,465 | B2 | 11/2010 | Roberge et al. | |
| 7,892,022 | B2 | 2/2011 | Mostoller et al. | |
| 7,918,591 | B2 | 4/2011 | Lynch | |
| 7,950,832 | B2 * | 5/2011 | Tanaka | F21V 5/04 362/311.02 |
| 7,958,832 | B2 | 6/2011 | Meeker | |
| 7,959,332 | B2 | 6/2011 | Tickner et al. | |
| 7,980,736 | B2 * | 7/2011 | Soderman | F21K 9/00 362/249.02 |
| 7,993,034 | B2 | 8/2011 | Wegner | |
| 8,096,671 | B1 | 1/2012 | Cronk et al. | |
| 8,201,968 | B2 * | 6/2012 | Maxik | F21S 8/026 362/147 |
| 8,348,477 | B2 | 1/2013 | Tickner et al. | |
| 8,545,047 | B2 * | 10/2013 | Yip | F21V 7/0008 362/235 |
| 8,672,518 | B2 * | 3/2014 | Boomgaarden | F21S 8/026 362/147 |
| 8,967,844 | B2 * | 3/2015 | Boomgaarden | F21S 8/026 362/147 |
| 9,103,507 | B2 | 8/2015 | Allen et al. | |
| 2004/0090785 | A1 | 5/2004 | McInnis | |
| 2006/0126328 | A1 | 6/2006 | Coushaine | |
| 2008/0037255 | A1 * | 2/2008 | Wang | F21V 5/04 362/294 |
| 2008/0165535 | A1 | 7/2008 | Mazzochette | |
| 2008/0170398 | A1 | 7/2008 | Kim | |
| 2008/0232093 | A1 | 9/2008 | Kim | |
| 2008/0232116 | A1 | 9/2008 | Kim | |
| 2008/0278957 | A1 | 11/2008 | Pickard et al. | |
| 2008/0285271 | A1 | 11/2008 | Roberge et al. | |
| 2009/0034261 | A1 | 2/2009 | Grove | |
| 2009/0086474 | A1 | 4/2009 | Chou | |
| 2009/0086504 | A1 | 4/2009 | Kim | |
| 2009/0129086 | A1 | 5/2009 | Thompson, III | |
| 2009/0141506 | A1 | 6/2009 | Lan et al. | |
| 2009/0284976 | A1 | 11/2009 | Storch et al. | |
| 2009/0298376 | A1 | 12/2009 | Guillien et al. | |
| 2010/0053950 | A1 | 3/2010 | Higuchi | |
| 2010/0103678 | A1 | 4/2010 | Van De Ven et al. | |
| 2011/0051414 | A1 * | 3/2011 | Bailey | F21K 9/13 362/235 |
| 2012/0262921 | A1 | 10/2012 | Boomgaarden et al. | |

OTHER PUBLICATIONS

European Office Action for Application No. 10174449.8; Mailed on Apr. 8, 2013. 4 pages.

U.S. Office Action re U.S. Appl. No. 14/134,884 dated May 1, 2014; 10 pages.

U.S. Office Action re U.S. Appl. No. 14/134,884 dated Oct. 28, 2014; 10 pages.

Cree, Inc., Defendant, "Preliminary Invalidity Contentions", filed in the United States District Court for the Middle District of Florida Orlando Division, Case No. 6:13-cv-00587-RBD-GJK, on Dec. 20, 2013; 122 pages.

European Office Action for Application No. 10174449.8; Dated Sep. 12, 2014.

Exhibit 44—Lighting Research Center, Lighting Research Program Project 2.3 Low-Profile LED Luminaries, PIER Final Project Report, prepared for the California Energy Commission, Apr. 2007, pp. 1-66, CEC-500-2005-141-A4.

Exhibit 46—Inteltech Corporation, Silescent 100i LV Light literature, Rev. May 2008, 4 pages.

Exhibit 48—Cree, Inc., LR6 Six-Inch LED Downlight product literature, Rev. Dec. 19, 2012, 4 pages.

Exhibit 51—Matsushita Electric Works, Ltd., Mforce High-Output, High-Color Rendering LED Unit for Lighting product literature, Annual Report 2007, 2 pages.

Exhibit A—"Cooper Lighting's Initial Disclosure of Non-Infringement Contentions", filed in the United States District Court for the Middle District of Florida Orlando Division, Case No. 6:13-cv-00587-RBD-GJK, 15 pages.

(56) References Cited

OTHER PUBLICATIONS

Exhibit B—"Cooper Lighting's Initial Disclosure of Invalidity Contentions (Anticipation)", filed in the United States District Court for the Middle District of Florida Orlando Division, Case No. 6:13-cv-00587-RBD-GJK, 22 pages.
Exhibit C—"Cooper Lighting's Initial Disclosure of Invalidity Contentions (Obviousness)", filed in the United States District Court for the Middle District of Florida Orlando Division, Case No. 6:13-cv-00587-RBD-GJK, 29 pages.
Exhibit D—Cree, Inc., Defendant, "Preliminary Invalidity Contentions", filed in the United States District Court for the Middle District of Florida Orlando Division, Case No. 6:13-cv-00587-RBD-GJK, on Dec. 20, 2013; 500 pages.
Exhibit E—U.S. Patent Application Publication No. US2009/0086474 A1 (Chou), filed in the United States District Court for the Middle District of Florida Orlando Division, Case No. 6:13-cv-00587-RBD-GJK, 283 pages.
USPTO, Notice of Allowance for U.S. Appl. No. 14/702,149 dated Sep. 29, 2016; 16 pages.
U.S. Non-Final Office action for U.S. Appl. No. 15/237,804, dated Dec. 29, 2016; 14 pages.
Generation Brands, Inc., Defendant, "Defendant's Preliminary Invalidity Contentions for U.S. Pat. No. 8,201,968", filed in the United States District Court for the Middle District of Florida Orlando Division, Case No. 6:16-cv-338-RBD-GJK, 67 pages.
Generation Brands, Inc., Defendant, "Defendant's Preliminary Invalidity Contentions for U.S. Pat. No. 8,967,844", filed in the United States District Court for the Middle District of Florida Orlando Division, Case No. 6:16-cv-338-RBD-GJK, 74 pages.
American De Rosa Lamparts, LLC, Defendant, "Defendant and Counterclaim Plaintiff's Preliminary Invalidity Contentions", filed in the United States District Court for the Middle District of Florida Orlando Division, Case No. 6:16-cv-1087-ORL-41KRS, 233 pages.
Technical Consumer Products, Inc., Defendant, "Defendant Technical Consumer Products, Inc.'s Initial Invalidity Contentions", filed in the United States District Court for the Middle District of Florida Orlando Division, Case No. 6:16-cv-1255-Orl-375GJK, 414 pages.
Nicor, Inc., Defendant, "Defendant Nicor, Inc.'s Preliminary Non-Infringement and Invalidity Disclosures", filed in the United States District Court for the Middle District of Florida Orlando Division, Case No. 6:16-cv-413-ORL-37GJK, 60 pages.
Amax Lighting, Inc., Defendant, "AMAX Lighting's Non-Infringement Contentions and Invalidity Contentions", filed in the United States District Court for the Middle District of Florida Orlando Division, Case No. 6:16-01321-Orl-37GJK, 470 pages.
Non-Final Office Action dated Feb. 28, 2017 filed in related U.S. Appl. No. 14/956,968 (14 pages).

* cited by examiner

LOW PROFILE LIGHT AND ACCESSORY KIT FOR THE SAME

CROSS REFERENCE TO RELATED APPLICATIONS

This application is a continuation of U.S. application Ser. No. 14/134,884, filed Dec. 19, 2013, which is a continuation of U.S. application Ser. No. 13/476,388, filed May 21, 2012, now U.S. Pat. No. 8,672,518, which is a continuation-in-part of U.S. application Ser. No. 12/775,310, filed May 6, 2010, now U.S. Pat. No. 8,201,968, which claims the benefit of U.S. Provisional Application Ser. No. 61/248,665, filed Oct. 5, 2009, all of which are incorporated herein by reference in their entirety.

BACKGROUND OF THE INVENTION

The present disclosure relates generally to lighting, particularly to low profile lighting, and more particularly to low profile downlighting for retrofit applications.

Light fixtures come in many shapes and sizes, with some being configured for new work installations while others are configured for old work installations. New work installations are not limited to as many constraints as old work installations, which must take into account the type of electrical fixture/enclosure or junction box existing behind a ceiling or wall panel material. With recessed ceiling lighting, sheet metal can-type light fixtures are typically used, while surface-mounted ceiling and wall lighting typically use metal or plastic junction boxes of a variety of sizes and depths. With the advent of LED (light emitting diode) lighting, there is a great need to not only provide new work LED light fixtures, but to also provide LED light fixtures that are suitable for old work applications, thereby enabling retrofit installations. One way of providing old work LED lighting is to configure an LED luminaire in such a manner as to utilize the volume of space available within an existing fixture (can-type fixture or junction box). However, such configurations typically result in unique designs for each type and size of fixture. Accordingly, there is a need in the art for an LED lighting apparatus that overcomes these drawbacks.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes a luminaire having a heat spreader, a heat sink, a light source and an outer optic. The heat sink is substantially ring-shaped and is disposed around and in thermal communication with an outer periphery of the heat spreader. The light source is disposed in thermal communication with the heat spreader, the light source having a plurality of light emitting diodes (LEDs) that are disposed in thermal communication with the heat spreader such that the heat spreader facilitates transfer of heat from the LEDs to the heat sink. The outer optic is disposed in optical communication with the plurality of LEDs. The heat spreader, the heat sink and the outer optic, in combination, have an overall height H and an overall outside dimension D such that the ratio of H/D is so dimensioned as to: cover an opening defined by a nominally sized four-inch can light fixture; and, cover an opening defined by a nominally sized four-inch electrical junction box.

An embodiment of the invention includes a luminaire having a heat spreader, a heat sink, a light source, an outer optic, and a power conditioner. The heat sink is substantially ring-shaped and is disposed around and in thermal communication with an outer periphery of the heat spreader. The light source is disposed in thermal communication with the heat spreader, the light source having a plurality of light emitting diodes (LEDs) that are disposed in thermal communication with the heat spreader such that the heat spreader facilitates transfer of heat from the LEDs to the heat sink. The outer optic is disposed in optical communication with the plurality of LEDs. The power conditioner is disposed and configured to receive AC voltage from an electrical supply and to provide DC voltage for the plurality of LEDs.

An embodiment of the invention includes a luminaire having a heat spreader, a heat sink a light source, an outer optic, and a power conditioner. The heat sink is substantially ring-shaped and is disposed around and in thermal communication with an outer periphery of the heat spreader. The light source is disposed in thermal communication with the heat spreader, the light source having a plurality of light emitting diodes (LEDs) that are disposed in thermal communication with the heat spreader such that the heat spreader facilitates transfer of heat from the LEDs to the heat sink. The outer optic is disposed in optical communication with the plurality of LEDs. The power conditioner is disposed and configured to receive AC voltage from an electrical supply and to provide DC voltage for the plurality of LEDs. The LEDs are disposed on one side of the heat spreader and the power conditioner is disposed on another opposing side of the heat spreader. The power conditioner is configured and sized to fit at least partially within an interior space of: a nominally sized can light fixture; and, a nominally sized electrical junction box. The heat spreader, the heat sink and the outer optic, in combination, have an overall height H and an overall outside dimension D such that the ratio of H/D is so dimensioned as to: cover an opening defined by a nominally sized four-inch can light fixture; and, cover an opening defined by a nominally sized four-inch electrical junction box.

An embodiment of the invention includes a luminaire having a heat spreader and a heat sink thermally coupled to and disposed diametrically outboard of the heat spreader, an outer optic securely retained relative to at least one of the heat spreader and the heat sink, and a light source disposed in thermal communication with the heat spreader, the light source having a plurality of light emitting diodes (LEDs). The heat spreader, the heat sink and the outer optic, in combination, have an overall height H and an overall outside dimension D such that the ratio of H/D is equal to or less than 0.25. The combination defined by the heat spreader, the heat sink and the outer optic, is so dimensioned as to: cover an opening defined by a nominally sized four-inch can light fixture; and, cover an opening defined by a nominally sized four-inch electrical junction box.

An embodiment of the invention includes a luminaire having a heat spreader and a heat sink thermally coupled to and disposed diametrically outboard of the heat spreader. An outer optic is securely retained relative to at least one of the heat spreader and the heat sink. A light source is disposed in thermal communication with the heat spreader, the light source having a plurality of light emitting diodes (LEDs). A power conditioner is disposed in electrical communication with the light source, the power conditioner being configured to receive AC voltage from an electrical supply line and to deliver DC voltage to the plurality of LEDs, the power conditioner being so dimensioned as to fit within at least one of: a nominally sized four-inch can light fixture; and, a nominally sized four-inch electrical junction box.

An embodiment of the invention includes a luminaire having a heat spreader, a heat sink thermally coupled to and disposed diametrically outboard of the heat spreader, an outer optic securely retained relative to at least one of the heat spreader and the heat sink, a light source disposed in thermal communication with the heat spreader, and an electrical supply line disposed in electrical communication with the light source. The heat spreader, heat sink and outer optic, in combination, have an overall height H and an overall outside dimension D such that the ratio of H/D is equal to or less than 0.25. The defined combination is so dimensioned as to: cover an opening defined by a nominally sized four-inch can light fixture; and, cover an opening defined by a nominally sized four-inch electrical junction box.

An embodiment of the invention includes a luminaire having a housing with a light unit and a trim unit. The light unit includes a light source, and the trim unit is mechanically separable from the light unit. A means for mechanically separating the trim unit from the light unit provides a thermal conduction path therebetween. The light unit has sufficient thermal mass to spread heat generated by the light source to the means for mechanically separating, and the trim unit has sufficient thermal mass to serve as a heat sink to dissipate heat generated by the light source.

An embodiment of the invention includes a luminaire for retrofit connection to an installed light fixture having a concealed in-use housing. The luminaire includes a housing having a light unit and a trim unit, the light unit having a light source, and the trim unit being mechanically separable from the light unit. The trim unit defines a heat sinking thermal management element, configured to dissipate heat generated by the light source, that is completely 100% external of the concealed in-use housing of the installed light fixture.

An embodiment of the invention includes a luminaire and accessory kit combination. The luminaire includes a heat spreader; a heat sink; an LED light source; a power supply; an electrical supply line having a first end connected to the power supply, and a second end connected to a plug-in connector; and, an optic securely retained relative to the heat spreader or heat sink. The accessory kit includes a first pre-wired jumper including a pair of insulated electrical wires having a first plug-in connector electrically connected at one end and an Edison base electrically connected at the other end; and/or, a second pre-wired jumper including a pair of insulated electrical wires having a second plug-in connector electrically connected at one end and unconnected wire ends at the other end. The plug-in connector of the first pre-wired jumper and the second pre-wired jumper are each configured to electrically engage with the plug-in connector of the electrical supply line.

An embodiment of the invention includes a luminaire having a light source having a plurality of light emitting diodes (LEDs), a heat spreader, and a substantially ring-shaped trim plate. The heat spreader is disposed between and in thermal communication with the light source and the trim plate such that the heat spreader facilitates transfer of heat from the LEDs to the trim plate. The trim plate is structurally configured and disposed for dissipating heat generated by the light source. The trim plate has an outer dimension that is larger than: an opening defined by a nominally sized can light fixture; and, an opening defined by a nominally sized electrical junction box.

An embodiment of the invention includes a luminaire having a light source having a plurality of light emitting diodes (LEDs), a single one-piece base, and a power conditioner. The single one-piece base includes both a heat spreader and a substantially ring-shaped trim plate such that a heat flow path between the heat spreader and the trim plate is continuous and uninterrupted, the heat spreader being disposed between and in thermal communication with the light source and the trim plate such that the heat spreader facilitates transfer of heat from the LEDs to the trim plate, the trim plate being structurally configured and disposed for dissipating heat generated by the light source. The power conditioner is structurally configured and disposed to receive AC voltage from an electrical supply and to provide DC voltage for the plurality of LEDs, the power conditioner being disposed, structurally configured and sized to fit at least partially within an interior space of: a nominally sized can light fixture; and, a nominally sized electrical junction box.

BRIEF DESCRIPTION OF THE DRAWINGS

Referring to the exemplary drawings wherein like elements are numbered alike in the accompanying Figures, abbreviated in each illustration as "FIG.".

DETAILED DESCRIPTION OF THE INVENTION

Figure 1:
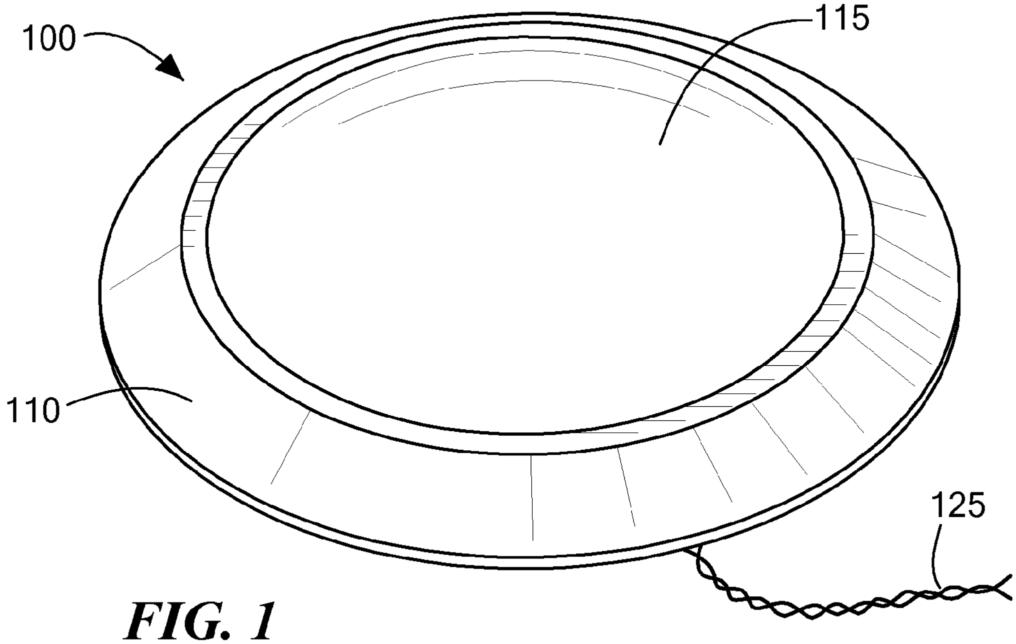
FIG. 1 depicts an isometric top view of a luminaire in accordance with an embodiment of the invention.
Figure 2:
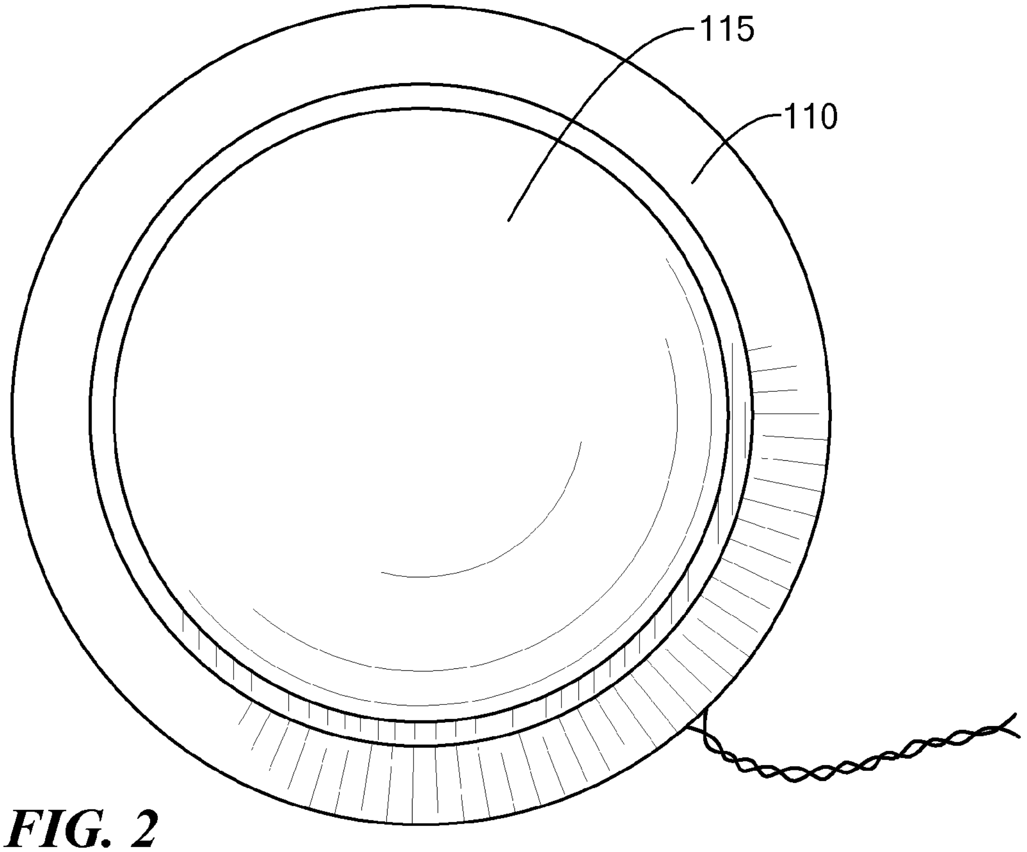
FIG. 2 depicts a top view of the luminaire of FIG. 1.

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

An embodiment of the invention, as shown and described by the various figures and accompanying text, provides a low profile downlight, more generally referred to as a luminaire, having an LED light source disposed on a heat spreader, which in turn is thermally coupled to a heat sink that also serves as the trim plate of the luminaire. The luminaire is configured and dimensioned for retrofit installation on standard can-type light fixtures used for recessed ceiling lighting, and on standard ceiling or wall junction boxes (J-boxes) used for ceiling or wall mounted lighting. The luminaire is also suitable for new work installation. Retrofit installation of the luminaire is accomplished utilizing an accessory kit that includes a pre-wired electrical jumper and mounting hardware. For installations involving a can-type fixture, the pre-wired jumper includes a plug-in connector electrically connected to an Edison base via flexible insulated wires For installations involving a J-box, the pre-wired jumper includes a plug-in connector electrically connected to flexible insulated wires that may or may not be pre-stripped, or partially pre-stripped, on the opposing end.

While embodiments of the invention described and illustrated herein depict an example luminaire for use as a downlight when disposed upon a ceiling, it will be appreciated that embodiments of the invention also encompass other lighting applications, such as a wall sconce for example.

While embodiments of the invention described and illustrated herein depict example power conditioners having visually defined sizes, it will be appreciated that embodiments of the invention also encompass other power conditioners having other sizes as long as the power conditioners fall within the ambit of the invention disclosed herein.

Referring to FIGS. 1-26 collectively, a luminaire 100 includes a heat spreader 105, a heat sink 110 thermally coupled to and disposed diametrically outboard of the heat spreader, an outer optic 115 securely retained relative to at least one of the heat spreader 105 and the heat sink 110, a light source 120 disposed in thermal communication with the heat spreader 105, and an electrical supply line 125 disposed in electrical communication with the light source 120. To provide for a low profile luminaire 100, the combination of the heat spreader 105, heat sink 110 and outer optic 115, have an overall height H and an overall outside dimension D such that the ratio of H/D is equal to or less than 0.25. In an example embodiment, height H is 1.5-inches, and outside dimension D is a diameter of 7-inches. Other dimensions for H and D are contemplated such that the combination of the heat spreader 105, heat sink 110 and outer optic 115, are configured and sized so as to; (i) cover an opening defined by an industry standard can-type light fixture having nominal sizes from three-inches to six-inches, such as a four-inch can or a six-inch can for example (see FIGS. 14 and 15 for example); and, (ii) cover an opening defined by an industry standard electrical junction box having nominal sizes from three-inches to six-inches, such as a four-inch J-box or a six-inch J-box for example (see FIGS. 16 and 17 for example). Since can-type light fixtures and ceiling/wall mount junction boxes are designed for placement behind a ceiling or wall material, an example luminaire has the back surface of the heat spreader 105 substantially planar with the back surface of the heat sink 110, thereby permitting the luminaire 100 to sit substantially flush on the surface of the ceiling/wall material. Alternatively, small standoffs 200 (see FIG. 12 for example) may be used to promote air movement around the luminaire 100 for improved heat transfer to ambient air, which will be discussed further below. Securement of the luminaire 100 to a junction box may be accomplished by using suitable fasteners through appropriately spaced holes 150 (see FIG. 8 for example), and securement of the luminaire 100 to a can-type fixture may be accomplished by using extension springs 205 fastened at one end to the heat spreader 105 (see FIG. 12 for example) and then hooked at the other end onto an interior detail of the can-type fixture.

In an embodiment, the light source 120 includes a plurality of light emitting diodes (LEDs) (also herein referred to as an LED chip package), which is represented by the "checkered box" in FIGS. 5, 6 and 8-10. In application, the LED chip package generates heat at the junction of each LED die. To dissipate this heat, the LED chip package is disposed in suitable thermal communication with the heat spreader 105, which in an embodiment is made using aluminum, and the heat spreader is disposed in suitable thermal communication with the heat sink 110, which in an embodiment is also made using aluminum. To provide for suitable heat transfer from the heat spreader 105 to the heat sink 110, an embodiment employs a plurality of interconnecting threads 130, 135, which when tightened provide suitable surface area for heat transfer thereacross.

Embodiments of luminaire 100 may be powered by DC voltage, while other embodiments may be powered by AC voltage. In a DC-powered embodiment, the electrical supply lines 125, which receive DC voltage from a DC supply, are directly connected to the plurality of LEDs 120. Holes 210 (see FIG. 9 for example) in the heat spreader 105 permit passage of the supply lines 125 from the back side of the heat spreader 105 to the front side. In an AC-powered embodiment, a suitable power conditioner 140, 160, 165 (see FIGS. 8, 9 and 11 for example) is used.

Figure 8:
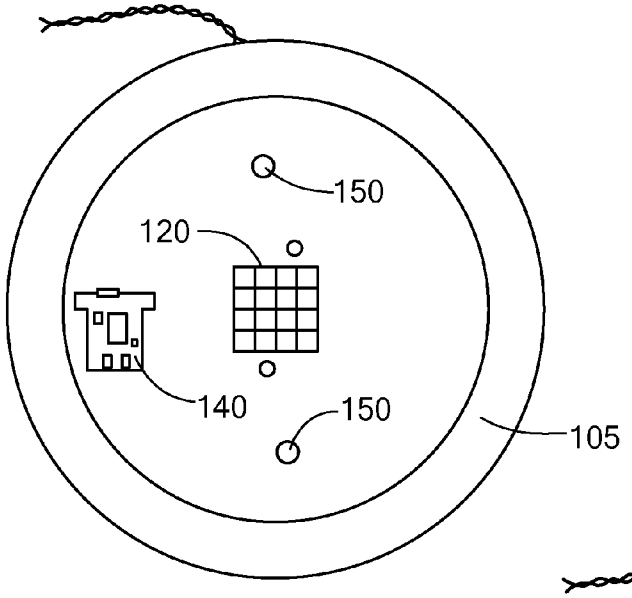
FIG. 8 depicts a top view of an alternative heat spreader assembly in accordance with an embodiment of the invention.

In an embodiment, and with reference to FIG. 8, power conditioner 140 is disposed on the heat spreader 105 on a same side of the heat spreader as the plurality of LEDs 120. In an embodiment, the power conditioner 140 is an electronic circuit board having electronic components configured to receive AC voltage from the electrical supply line 125 and to deliver DC voltage to the plurality of LEDs through appropriate electrical connections on either the front side or the back side of the heat spreader 105, with holes through the heat spreader or insulated electrical traces across the surface of the heat spreader being used as appropriate for the purposes.

Figure 9:
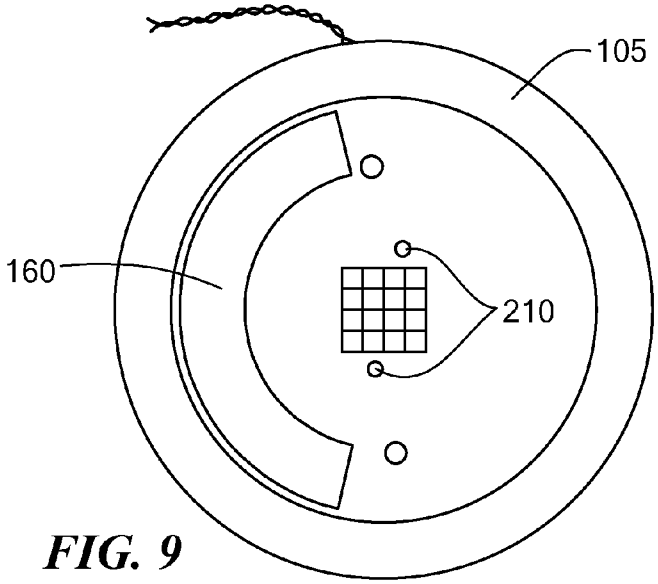
FIG. 9 depicts a top view of another alternative heat spreader assembly in accordance with an embodiment of the invention.

In an alternative embodiment, and with reference to FIG. 9, an arc-shaped electronic-circuit-board-mounted power conditioner 160 may be used in place of the localized power conditioner 140 illustrated in FIG. 8, thereby utilizing a larger available area of the heat spreader 105 without detracting from the lighting efficiency of luminaire 100.

Figure 11:
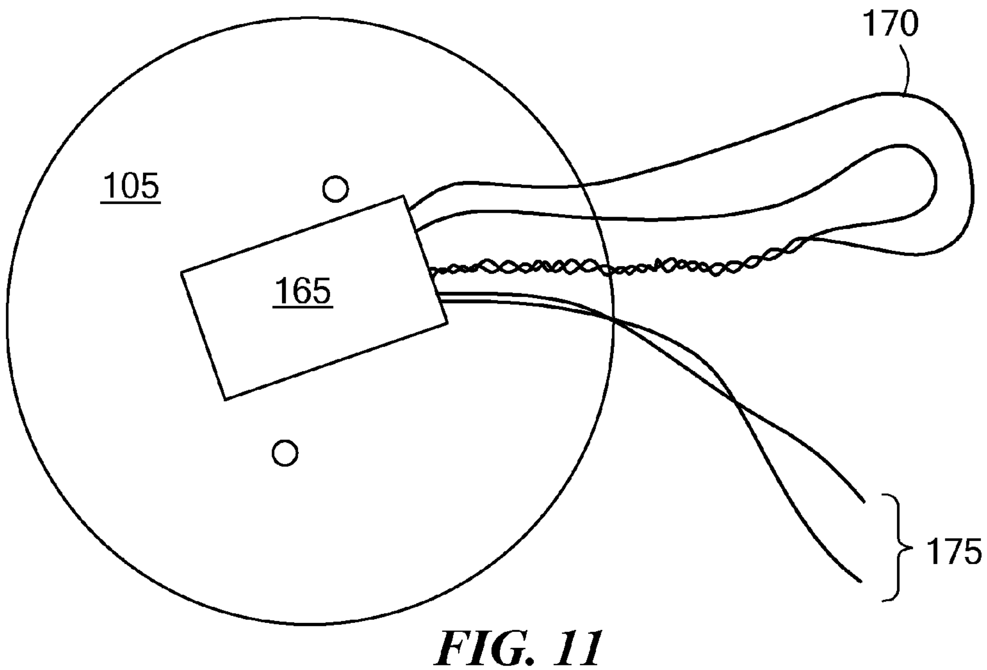
FIG. 11 depicts a bottom view of a heat spreader having a power conditioner in accordance with an embodiment of the invention.

In a further embodiment, and with reference to FIG. 11, a block-type power conditioner 165 (electronics contained within a housing) may be used on the back surface of the heat spreader 105, where the block-type power conditioner 165 is configured and sized to fit within the interior space of an industry-standard nominally sized can-type light fixture or an industry-standard nominally sized wall/ceiling junction box. Electrical connections between the power conditioner 165 and the LEDs 120 are made via wires 170, which may be contained within the can fixture or junction box, or may be self-contained within the power conditioner housing. Electrical wires 175 receive AC voltage via electrical connections within the can fixture or junction box.

Figure 12:
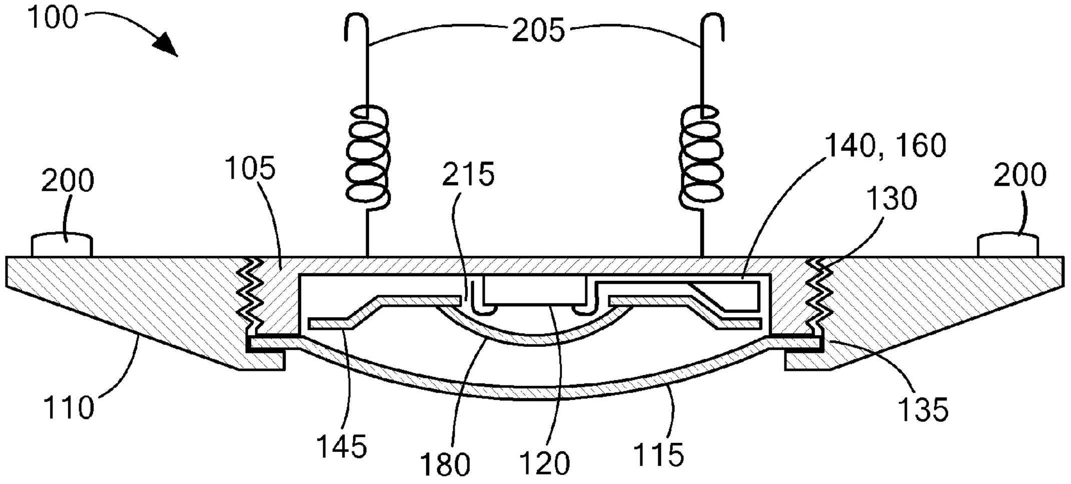
FIG. 12 depicts a section view of a luminaire in accordance with an embodiment of the invention.

Referring now to FIGS. 8-10 and 12, an embodiment includes a reflector 145 disposed on the heat spreader 105 so as to cover the power conditioner 140, 160, while permitting the plurality of LEDs 120 to be visible (i.e., uncovered) through an aperture 215 of the reflector 145. Mounting holes 155 in the reflector 145 align with mounting holes 150 in the heat spreader 105 for the purpose discussed above. The reflector 145 provides a reflective covering that hides power conditioner 140, 160 from view when viewed from the outer optic side of luminaire 100, while efficiently reflecting light from the LEDs 120 toward the outer optic 115. FIG. 12 illustrates a section view through luminaire 100, showing a stepped configuration of the reflector 145, with the power conditioner 140, 160 hidden inside a pocket (i.e., between the reflector 145 and the heat spreader 105), and with the LEDs 120 visible through the aperture 215. In an embodiment, the outer optic is made using a glass-bead-impregnated-plastic material. In an embodiment the outer optic 115 is made of a suitable material to mask the presence of a pixilated light source 120 disposed at the center of the luminaire. In an embodiment, the half angle power of the luminaire, where the light intensity of the light source when viewed at the outer optic drops to 50% of its maximum intensity, is evident within a central diameter of the outer optic that is equal to or greater than 50% of the outer diameter of the outer optic.

Figure 10:
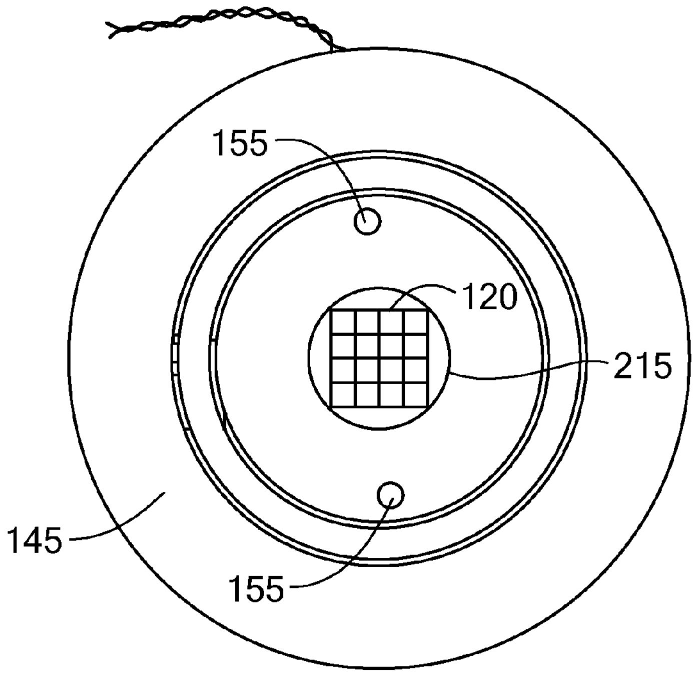
FIG. 10 depicts a top view of yet another alternative heat spreader assembly in accordance with an embodiment of the invention.

While FIG. 10 includes a reflector 145, it will be appreciated that not all embodiments of the invention disclosed herein may employ a reflector 145, and that when a reflector 145 is employed it may be used for certain optical preferences or to mask the electronics of the power conditioner 140, 160. The reflective surface of the reflector 145 may be white, reflective polished metal, or metal film over plastic, for example, and may have surface detail for certain optical effects, such as color mixing or controlling light distribution and/or focusing for example.

Referring to FIG. 12, an embodiment includes an inner optic 180 disposed over the plurality of LEDs 120. Employing an inner optic 180 not only provides protection to the LEDs 120 during installation of the luminaire 100 to a can fixture or junction box, but also offers another means of color-mixing and/or diffusing and/or color-temperature-adjusting the light output from the LEDs 120. In alternative embodiments, the inner optic 180 may be a standalone element, or integrally formed with the reflector 145. In an embodiment, the LEDs 120 are encapsulated in a phosphor of a type suitable to produce a color temperature output of 2700 deg-Kelvin. Other LEDs with or without phosphor encapsulation may be used to produce other color temperatures as desired.

Figure 13:
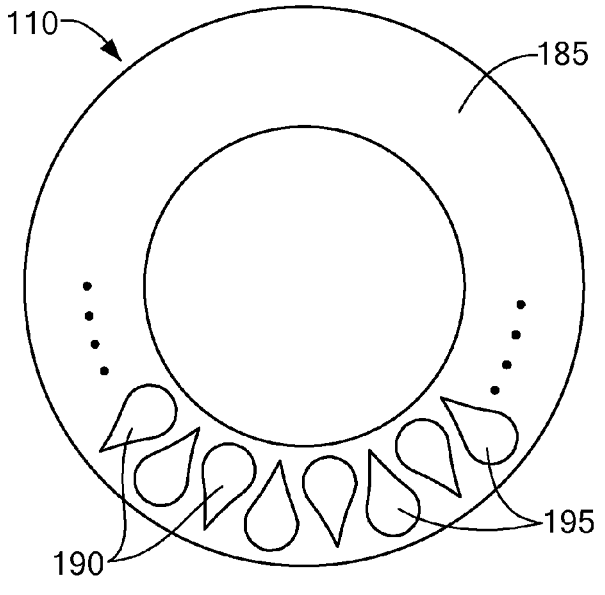
FIG. 13 depicts a bottom view of a heat sink having recesses in accordance with an embodiment of the invention.

Referring to FIG. 13, a back surface 185 of an embodiment of the heat sink 110 includes a first plurality of recesses 190 oriented in a first direction, and a second plurality of recesses 195 oriented in a second opposing direction, each recess of the first plurality and the second plurality having a shape that promotes localized air movement within the respective recess due at least in part to localized air temperature gradients and resulting localized air pressure gradients. Without being held to any particular theory, it is contemplated that a teardrop-shaped recess 190, 195 each having a narrow end and an opposing broad end will generate localized air temperatures in the narrow end that are higher than localized air temperatures in the associated broad end, due to the difference of proximity of the surrounding "heated" walls of the associated recess. It is contemplated that the presence of such air temperature gradients, with resulting air pressure gradients, within a given recess 190, 195 will cause localized air movement within the associated recess, which in turn will enhance the overall heat transfer of the thermal system (the thermal system being the luminaire 100 as a whole). By alternating the orientation of the recesses 190, 195, such that the first plurality of recesses 190 and the second plurality of recesses 195 are disposed in an alternating fashion around the circumference of the back 185 of the heat sink 110, it is contemplated that further enhancements in heat transfer will be achieved, either by the packing density of recesses achievable by nesting one recess 190 adjacent the other 195, or by alternating the direction vectors of the localized air temperature/pressure gradients to enhance overall air movement. In an embodiment, the first plurality of recesses 190 have a first depth into the back surface of the heat sink, and the second plurality of recesses 195 have a second depth into the back surface of the heat sink, the first depth being different from the second depth, which is contemplated to further enhance heat transfer.

Figure 15:
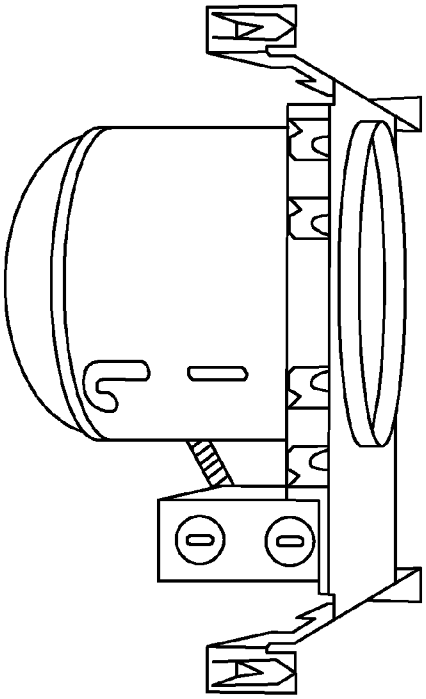
FIGS. 14-18 depict isometric views of existing electrical can-type light fixtures and electrical junction boxes for use in accordance with an embodiment of the invention.
Figure 18:
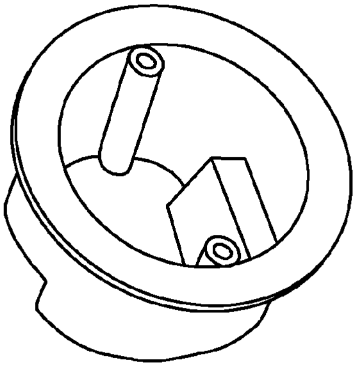
Figure 17:
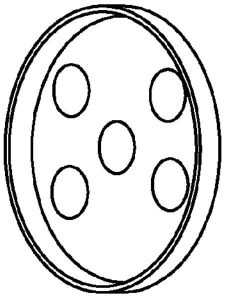
Figure 16:
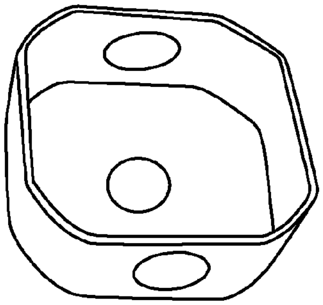

FIGS. 14-18 illustrate typical industry standard can-type light fixtures for recessed lighting (FIGS. 14-15), and typical industry standard electrical junction boxes for ceiling or wall mounted lighting (FIGS. 16-18). Embodiments of the invention are configured and sized for use with such fixtures of FIGS. 14-18.

Figure 19:
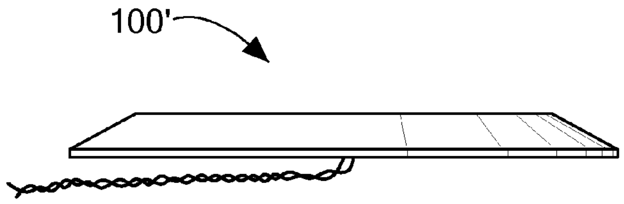
FIGS. 19-21 depict a side view, top view and bottom view, respectively, of a luminaire similar but alternative to that of FIGS. 2-4, in accordance with an embodiment of the invention.
Figure 20:
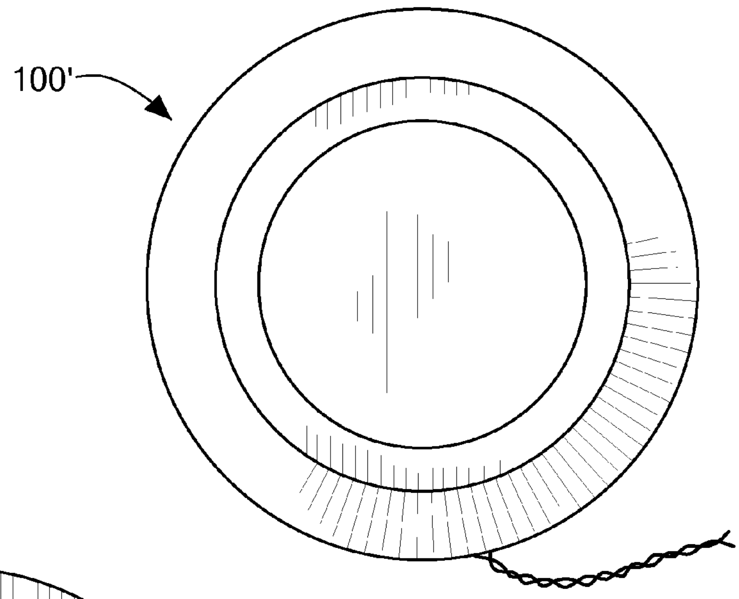
Figure 21:
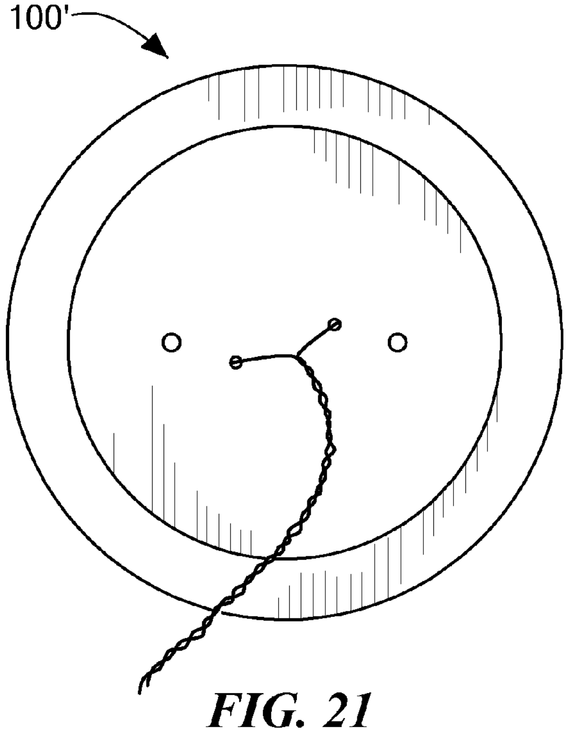

FIGS. 19-21 illustrate an alternative luminaire 100' having a different form factor (flat top, flat outer optic, smaller appearance) as compared to luminaire 100 of FIGS. 1-4.

Figure 22:
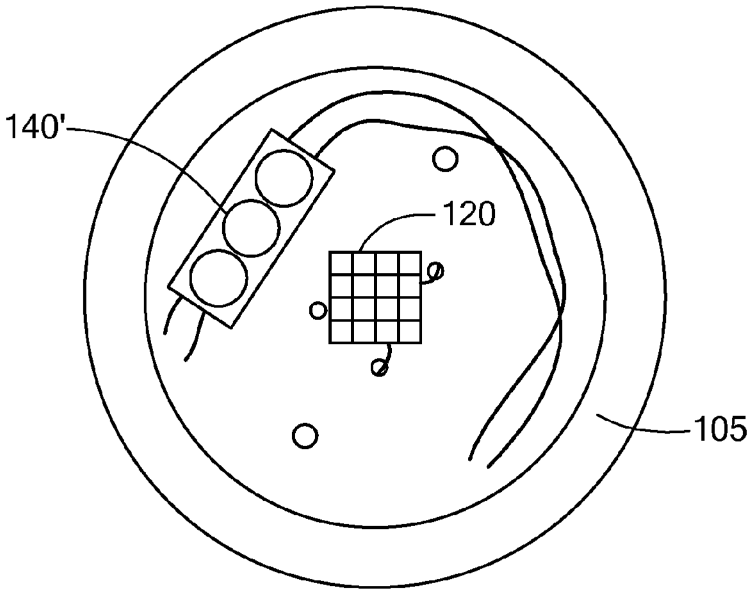
FIGS. 22-23 depict top and bottom views, respectively, of a heat spreader having an alternative power conditioner in accordance with an embodiment of the invention.
Figure 23:
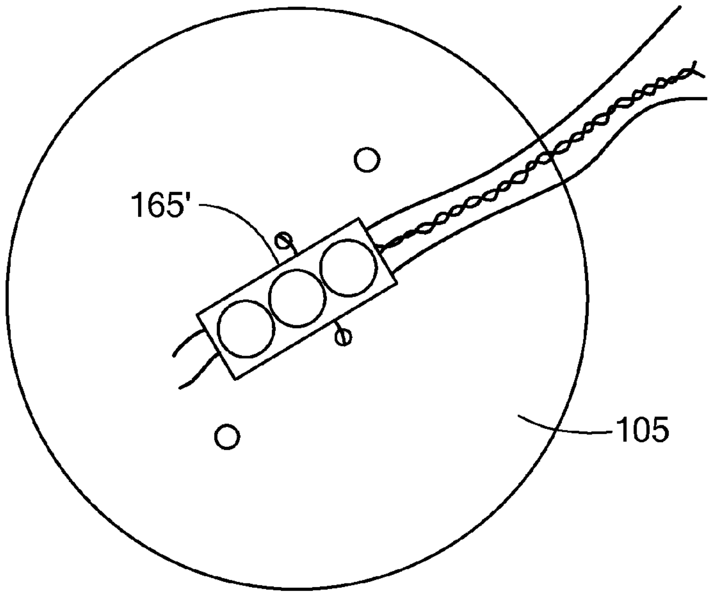

FIGS. 22-23 illustrate alternative electronic power conditioners 140', 165' having a different form factor as compared to power conditioners 140, 165 of FIGS. 8 and 11, respectively. All alternative embodiments disclosed herein, either explicitly, implicitly or equivalently, are considered within the scope of the invention.

Figure 24:
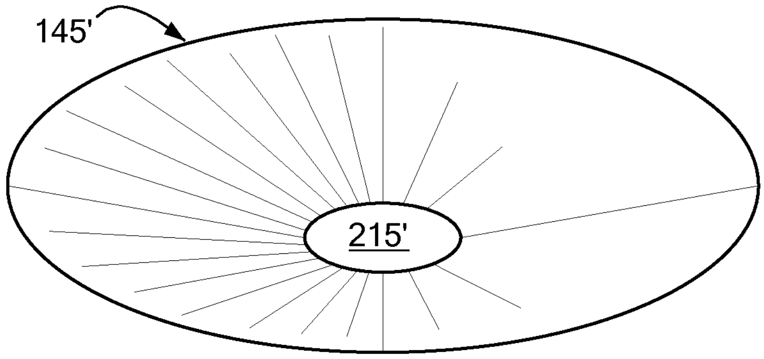
FIG. 24-26 depict in isometric, top and side views, respectively, an alternative reflector to that depicted in FIGS. 10 and 12.
Figure 25:
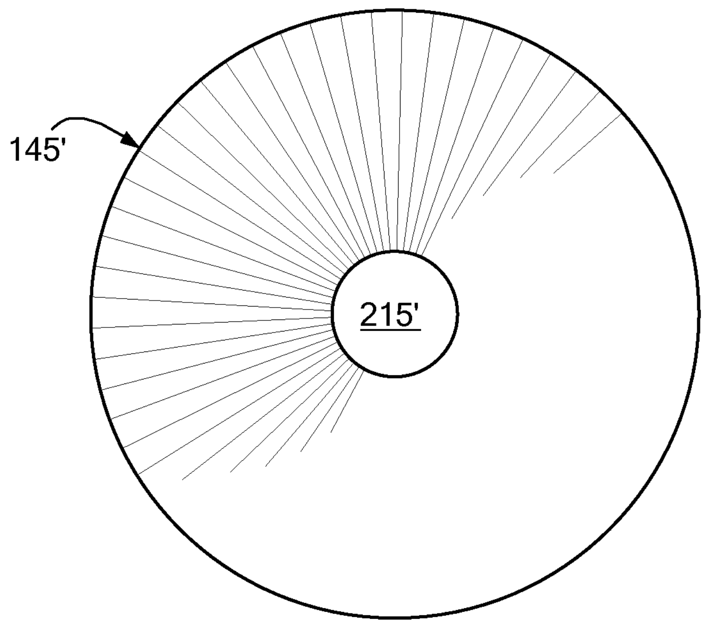
Figure 26:
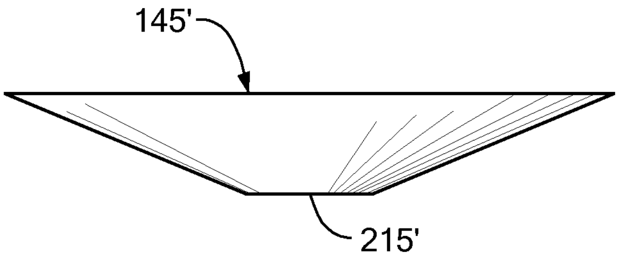

FIGS. 24-26 illustrate an alternative reflector 145' to that illustrated in FIGS. 10 and 12, with FIG. 24 depicting an isometric view, FIG. 25 depicting a top view, and FIG. 26 depicting a side view of alternative reflector 145'. As illustrated, reflector 145' is conically-shaped with a centrally disposed aperture 215' for receiving the LED package 120. The cone of reflector 145' has a shallow form factor so as to fit in the low profile luminaire 100, 100'. Similar to reflector 145, the reflective surface of the reflector 145' may be white, reflective polished metal, or metal film over plastic, for example, and may have surface detail for certain optical effects, such as color mixing or controlling light distribution and/or focusing for example. As discussed herein with respect to reflector 145, alternative reflector 145' may or may not be employed as required to obtain the desired optical effects.

From the foregoing, it will be appreciated that embodiments of the invention also include a luminaire 100 with a housing (collectively referred to by reference numerals 105, 110 and 115) having a light unit (collectively referred to by reference numerals 105 and 115) and a trim unit 110, the light unit including a light source 120, the trim unit being mechanically separable from the light unit, a means for mechanically separating 130, 135 the trim unit from the light unit providing a thermal conduction path therebetween, the light unit having sufficient thermal mass to spread heat generated by the light source to the means for mechanically separating, the trim unit having sufficient thermal mass to serve as a heat sink to dissipate heat generated by the light source.

From the foregoing, it will also be appreciated that embodiments of the invention further include a luminaire 100 for retrofit connection to an installed light fixture having a concealed in-use housing (see FIGS. 14-18 for example), the luminaire including a housing 105, 110, 115 having a light unit 105, 115 and a trim unit 110, the light unit comprising a light source 120, the trim unit being mechanically separable from the light unit, the trim unit defining a heat sinking thermal management element configured to dissipate heat generated by the light source that is completely 100% external of the concealed in-use housing of the installed light fixture. As used herein, the term "concealed in-use housing" refers to a housing that is hidden behind a ceiling or a wall panel once the luminaire of the invention has been installed thereon.

Figure 27:
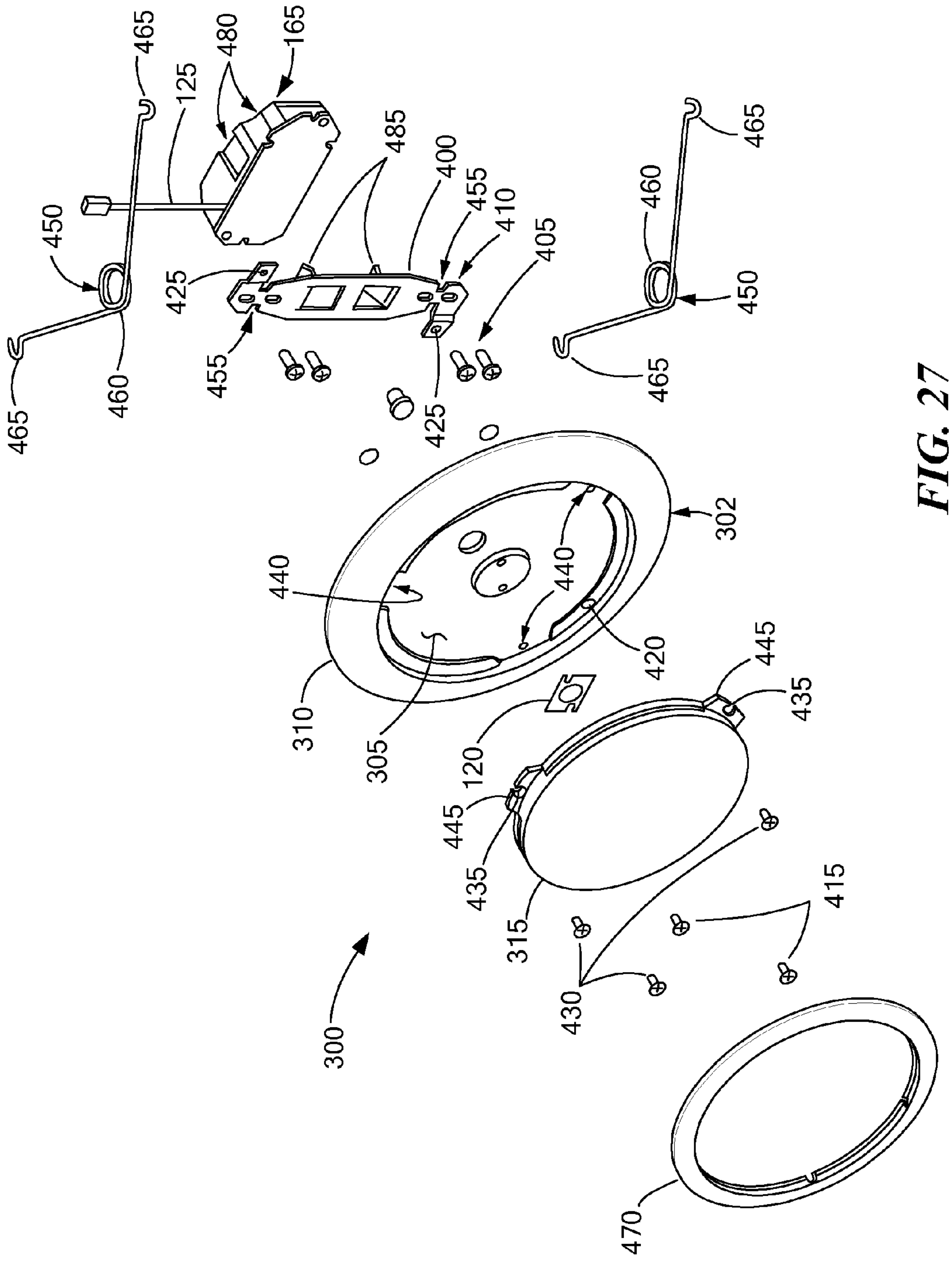
FIG. 27 depicts an exploded assembly view of an alternative luminaire in accordance with an embodiment of the invention.

Reference is now made to FIG. 27, which depicts an exploded assembly view of an alternative luminaire 300 to that depicted in FIGS. 1-12. Similar to luminaire 100 (where like elements are numbered alike, and similar elements are named alike but numbered differently), luminaire 300 includes a heat spreader 305 integrally formed with a heat sink 310 disposed diametrically outboard of the heat spreader 305 (the heat spreader 305 and heat sink 310 are collectively herein referred to as base 302), an outer optic 315 securely retained relative to at least one of the heat spreader 305 and the heat sink 310, a light source (LED) 120 disposed in thermal communication with the heat spreader 305, and an electrical supply line 125 disposed in electrical communication with the light source 120. The integrally formed heat spreader 305 and heat sink 310 provides for improved heat flow from the LED 120 to the heat sink 310 as the heat flow path therebetween is continuous and uninterrupted as compared to the luminaire 100 discussed above.

Figure 28:
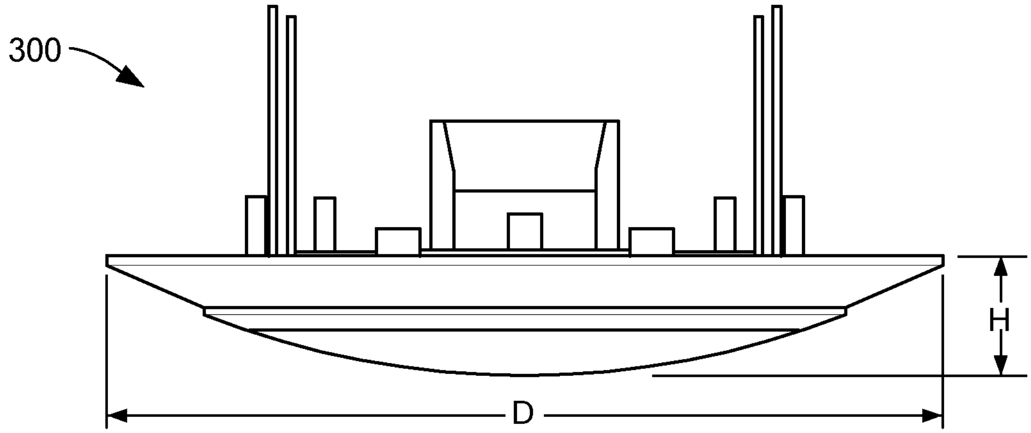
FIG. 28 depicts a side view of the luminaire of FIG. 27.

To provide for a low profile luminaire 300, the combination of the heat spreader 305, heat sink 310 and outer optic 315, have an overall height H and an overall outside dimension D such that the ratio of H/D is equal to or less than 0.25 (best seen by reference to FIG. 28). In an example embodiment, height H is 1.5-inches, and outside dimension D is a diameter of 7-inches. Other dimensions for H and D are contemplated such that the combination of the heat spreader 305, heat sink 310 and outer optic 315, are so configured and dimensioned as to; (i) cover an opening defined by an industry standard can-type light fixture having nominal sizes from three-inches to six-inches, such as a four-inch can or a six-inch can for example (see FIGS. 14 and 15 for example); and, (ii) cover an opening defined by an industry standard electrical junction box having nominal sizes from three-inches to six-inches, such as a four-inch J-box or a six-inch J-box for example (see FIGS. 16 and 17 for example). Since can-type light fixtures and ceiling/wall mount junction boxes are designed for placement behind a ceiling or wall material, an example luminaire 300 has the back surface of the heat spreader 305 substantially planar with the back surface of the heat sink 310, thereby permitting the luminaire 300 to sit substantially flush on the surface of the ceiling/wall material. Alternatively, small standoffs 200 (see FIG. 12 in combination with FIG. 27 for example) may be used to promote air movement around the luminaire 300 for improved heat transfer to ambient, as discussed above.

Securement of the luminaire 300 to a junction box (see FIGS. 16-18 for example) may be accomplished by using a bracket 400 and suitable fasteners 405 (four illustrated) through appropriately spaced holes 410 (four illustrated) in the bracket 400. Securement of the base 302 to the bracket 400 is accomplished using suitable fasteners 415 (two illustrated) through appropriately spaced holes 420 (two used, diametrically opposing each other, but only one visible) in the base 302, and threaded holes 425 (two illustrated) in the bracket 400. Securement of the optic 315 to the base 302 is accomplished using suitable fasteners 430 (three illustrated) through appropriately spaced holes 435 (three used, spaced 120 degrees apart, but only two illustrated) in tabs 445 of the optic 315, and threaded holes 440 (three used, spaced 120 degrees apart, but only two illustrated) in the base 302. A trim ring 470 circumferentially snap-fits over the optic 315 to hide the retaining fasteners 430, the holes 435 and the tabs 445. The snap-fit arrangement of the trim ring 470 relative to the optic 315 is such that the trim ring 470 can be removed in a pop-off manner for maintenance or other purposes. In an embodiment, securement of the optic 315 to the base 302 is accomplished using an insert-and-rotate action, where legs are integrally formed with, or molded onto, the optic 315 in place of the tabs 445, and where engagement openings are integrally formed with the base 302 in place of the holes 440. In another embodiment, securement of the optic 315 to the base 302 is accomplished using a snap-fit arrangement, where snap-fits legs are integrally formed with, or molded onto, the optic 315 in place of the tabs 445, and where snap-fit receptors are integrally formed with the base 302 in place of the holes 440.

In an embodiment, securement of the luminaire 300 to a junction box (see FIGS. 16-18 for example) may be accomplished without using a bracket 400. That is, the luminaire 300 may be directly secured to a junction box using appropriate size and length hardware that passes through appropriately sized and placed holes in the base 302 to engage with the preformed standard securement holes formed in the J-box.

Figure 14:
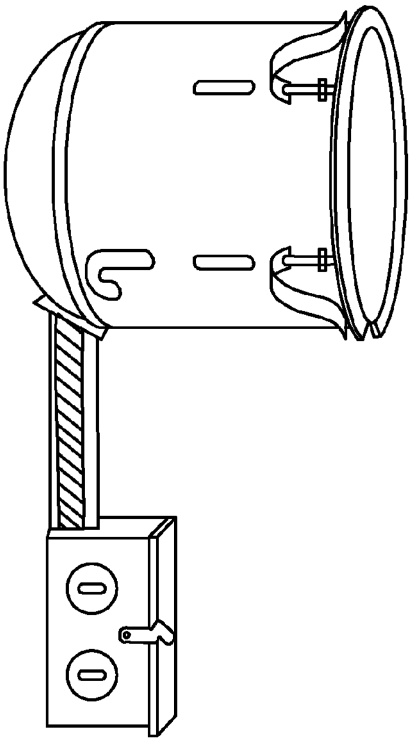

Securement of the luminaire 300 to a can-type fixture (see FIGS. 14-15 for example) may be accomplished by using two torsion springs 450 each loosely coupled to the bracket 400 at a pair of notches 455 by placing the circular portion 460 of each torsion spring 450 over the pairs of notches 455, and then engaging the hook ends 465 of the torsion spring 450 with suitable detents in the can-type fixture (known detent features of can-type light fixtures are depicted in FIGS. 14-15). In an embodiment, the circular portion 460 of each torsion spring 450 and the distance between each notch of a respective pair of notches 455 are so dimensioned as to permit the torsion springs 450 to lay flat (that is, parallel with the back side of luminaire 300) during shipping, and to be appropriately rotated for engagement with a can-type fixture during installation (as illustrated in FIGS. 27-30).

A power conditioner 165 similar to that discussed above in connection with FIG. 11 receives AC power from electrical connections within the junction box or can-type fixture, and provides conditioned DC power to the light source (LED) 120. While illustrative details of the electrical connections between the power conditioner 165 and the light source (LED) 120 are not specifically shown in FIG. 27, one skilled in the art will readily understand how to provide such suitable connections when considering all that is disclosed herein in combination with information known to one skilled in the art. The housing of power conditioner 165 includes recesses 480 (one on each side, only one illustrated) that engage with tabs 485 of the bracket 400 to securely hold the power conditioner 165 in a snap-fit or frictional-fit engagement relative to the bracket 400.

Figure 3:
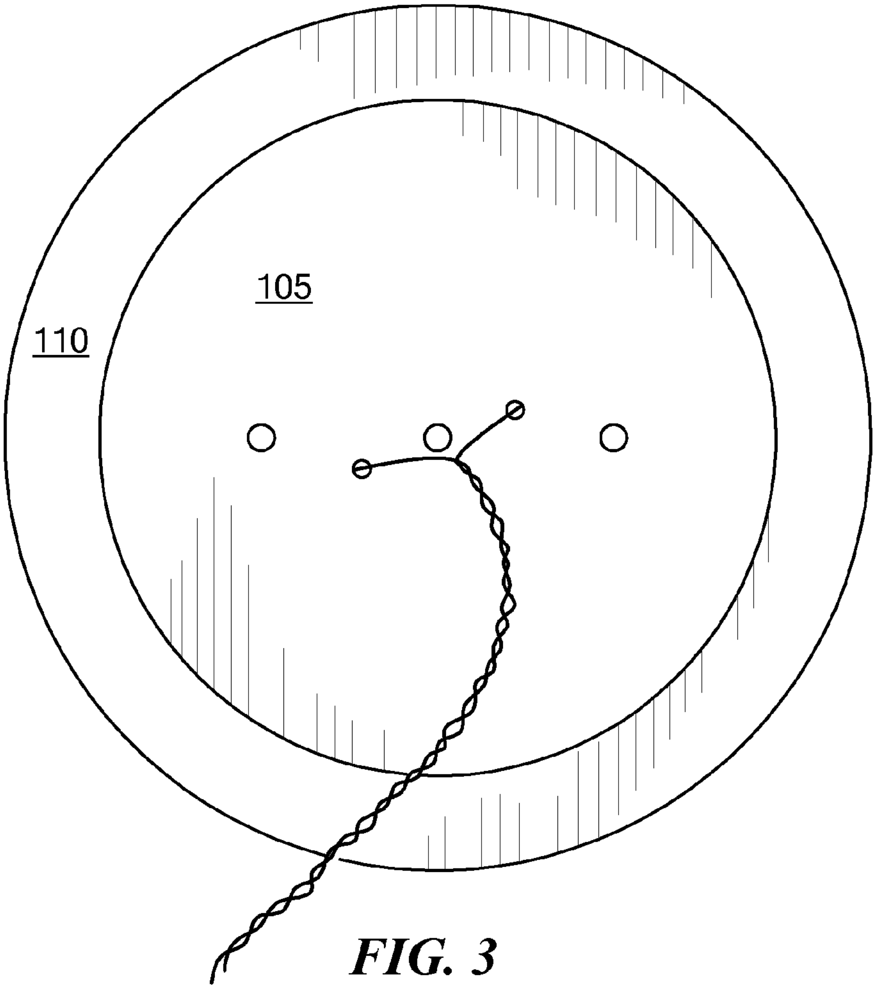
FIG. 3 depicts a bottom view of the luminaire of FIG. 1.
Figure 4:
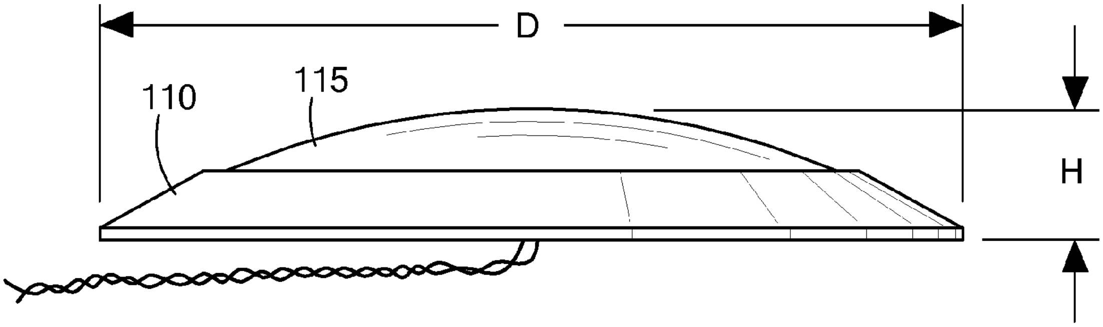
FIG. 4 depicts a side view of the luminaire of FIG. 1.
Figure 5:
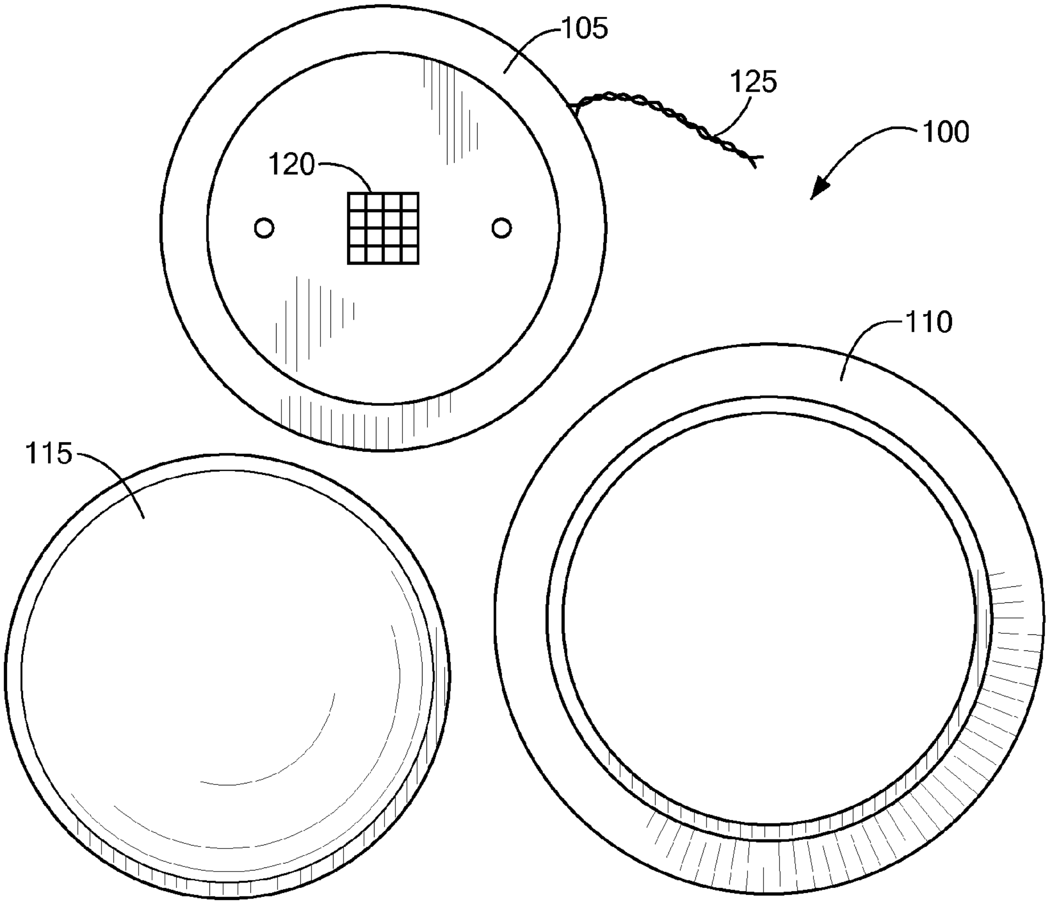
FIG. 5 depicts a top view of a heat spreader assembly, a heat sink, and an outer optic in accordance with an embodiment of the invention.
Figure 6:
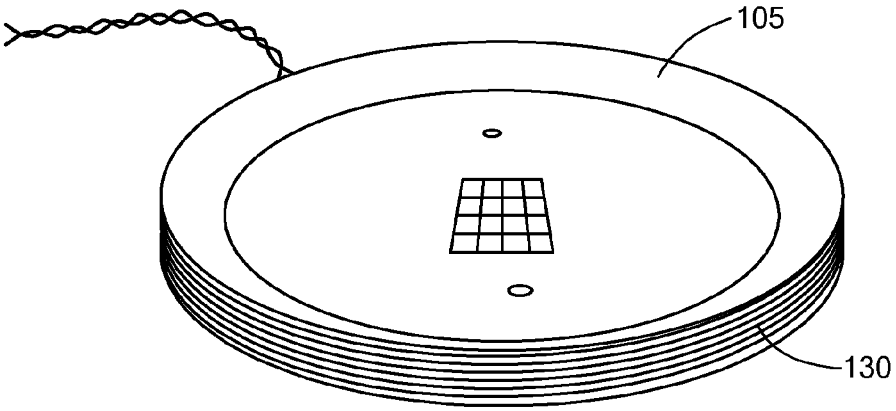
FIG. 6 depicts an isometric view of the heat spreader of FIG. 5.
Figure 7:
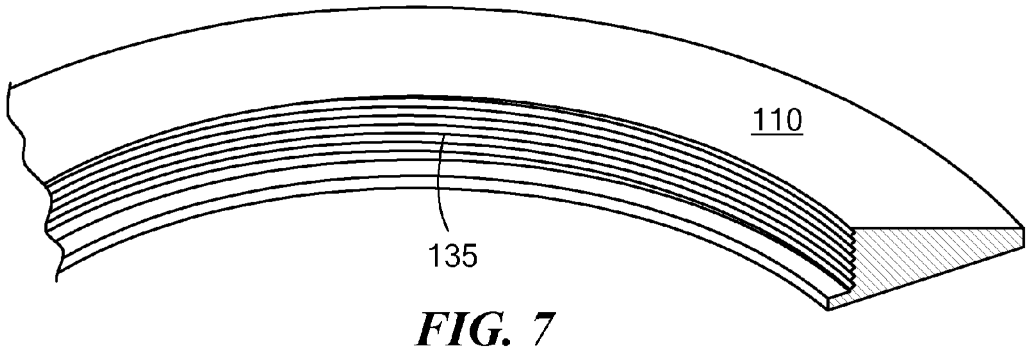
FIG. 7 depicts a partial isometric view of the heat sink of FIG. 5.
Figure 29:
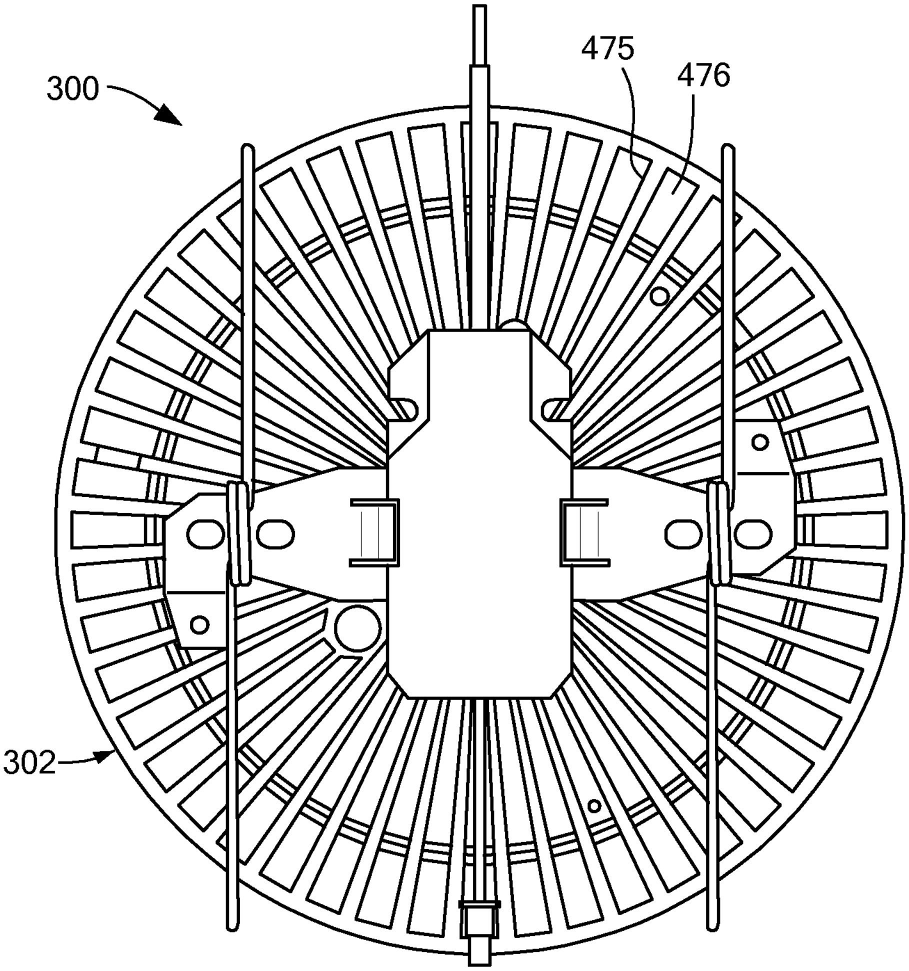
FIG. 29 depicts a back view of the luminaire of FIG. 27.

Reference is now made to FIGS. 28 and 29, which depict a side view and a back view, respectively, of the luminaire 300. As discussed above in reference to FIG. 28, an overall height H and an overall outside dimension D is such that the ratio of H/D is equal to or less than 0.25. The back view depicted in FIG. 29 is comparable with the back view depicted in FIGS. 3, 11 and 13, but with a primary difference that can be seen in the configuration of the heat sinking fins. In FIGS. 3, 11 and 13, the back surface 185 of the heat sink 110 includes a first plurality of recesses 190 oriented in a first direction, and a second plurality of recesses 195 oriented in a second opposing direction, with each recess of the first plurality and the second plurality having a shape that promotes localized air movement within the respective recess due at least in part to localized air temperature gradients and resulting localized air pressure gradients. Such recesses 190, 195 were employed at least in part due to the radial dimension of the heat sink 110, which is ring-like in shape. In FIG. 29, and as discussed above, the heat sink 310 is integrally formed with the heat spreader 305 to form the base 302. With such an integrally formed base arrangement, radially oriented heat sink fins 475 are integrally formed over a substantial portion of the back surface of the base 302, which provide for greater heat transfer than is available by the recesses 190, 195 having a more limited radial dimension that is limited by the configuration of the heat sink 110. Heat sink fins 475 alternate with adjacently disposed and radially oriented recesses 476 to form a star pattern about the center of the back side of luminaire 300. Such a star pattern provides a plurality of air flow channels on the back side of the base 302 for efficiently distributing and dissipating heat generated by the light source (LED) 120 disposed on the front side of the heat spreader 305 of the base 302.

While heat sink 110 has herein been described having recesses 190, 195, and base 302 has herein been described having heat sink fins 475 and recesses 476, for efficiently distributing and dissipating heat generated by the light source (LED) 120, it will be appreciated that not all heat sinks will require fins and recesses depending on the power requirements of the luminaire, the power efficiency of the luminaire, the heat generated by the luminaire, and the heat transfer characteristics of the luminaire. As such, the scope of the invention is not limited to the inclusion of such fins and recesses, but also includes heat sinks that are absent fins and recesses but structured appropriately for distributing and dissipating heat generated by the light source.

Figure 30:
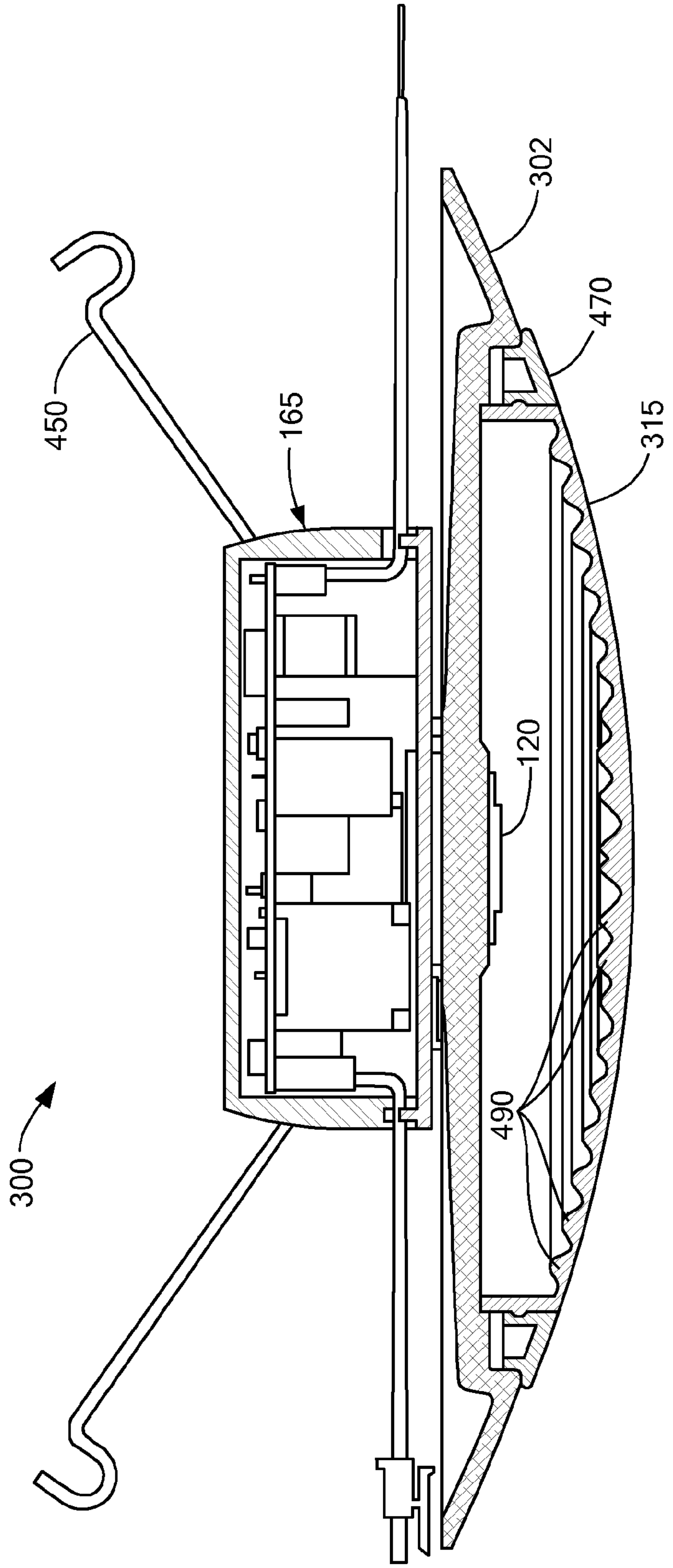
FIG. 30 depicts a cross section view of the luminaire of FIG. 27, and more particularly depicts a cross section view of the outer optic used in accordance with an embodiment of the invention.

In an embodiment, and with reference now to FIG. 30, the outer optic 315 forms a blondel-type lens having a plurality of concentric circular flutes/ridges 490 formed and disposed on the inside surface of the outer optic 315. With such a lens, the exact location of the light source 120 within the luminaire 300 is masked from the perspective of an observer standing a distance away from the luminaire 300, thereby providing for a more uniform distribution of light. Such a lens may also be suitable for outer optic 115. In an embodiment, the lens material used for outer optic 115, 315 may be frosted. Example materials considered suitable for use in outer optic 115, 315 include, but are not limited to, ACRYLITE® Acrylic Sheet Material available from CYRO Industries, and Acrylite Plus® also available from CYRO Industries.

Example materials considered suitable for use in reflector 145, 145' include, but are not limited to, MAKROLON® 2405, 2407 and 2456 available from Bayer Material Science, and MAKROLON® 6265 also available from Bayer Material Science.

Figure 31:
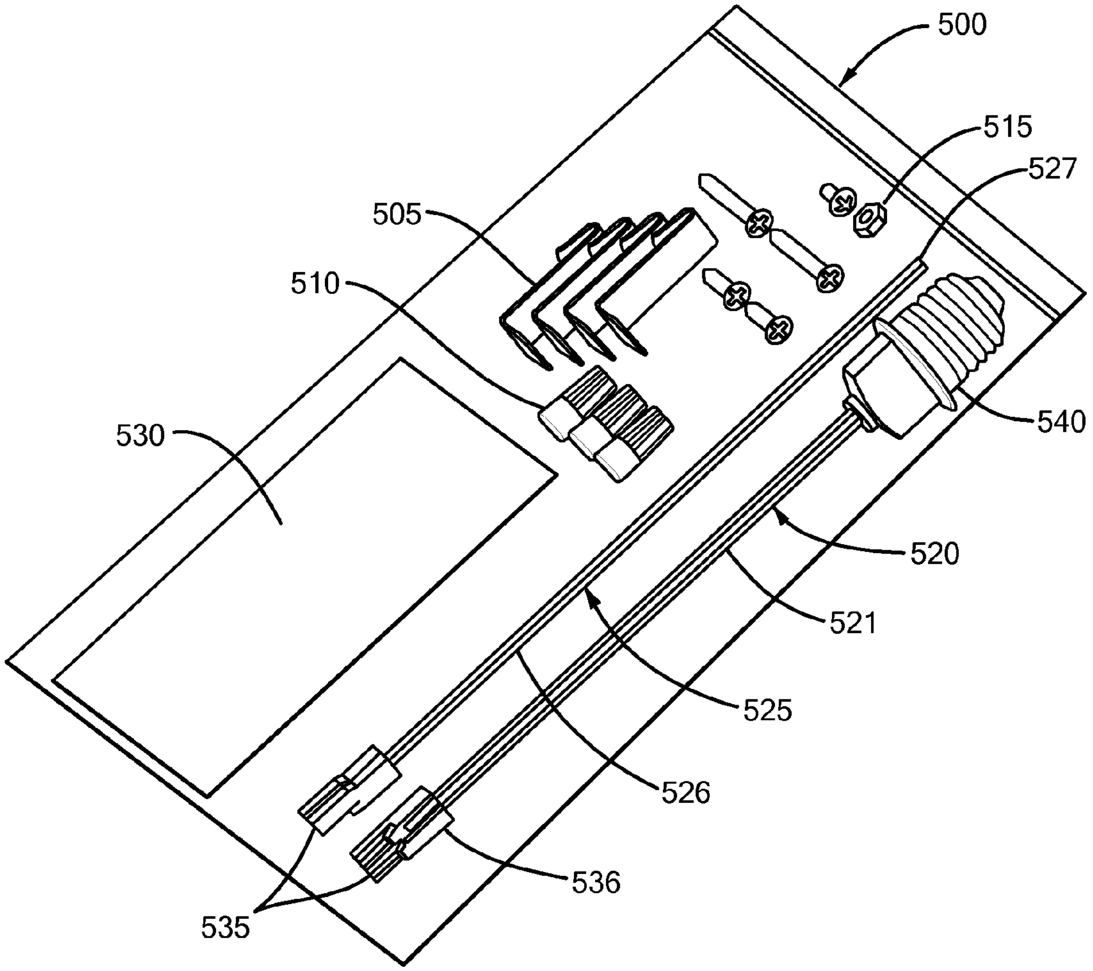
FIG. 31 depicts an accessory kit in accordance with an embodiment of the invention.

With reference now to FIG. 31, an accessory kit 500 is depicted having a set of formed springs 505, a set of twist-on wire connectors 510, a set of fasteners 515, a first pre-wired jumper 520, a second pre-wired jumper 525, and a set of installation instructions 530. Each of the first and second pre-wired jumpers 520, 525 include a pair of flexible wires (hot/black and neutral/white wires) 521, 526, and a plug-in male connector 535. The first pre-wired jumper 520 has an Edison base 540 mechanically and electrically connected to the end of the wire-pair 521 opposite that of the male connector 535. The wire-pair 521 and Edison base 540 are electrically connected with the proper polarity in a manner known in the art (hot wire electrically connected to the tip of the Edison base, neutral wire electrically connected to the screw threads of the Edison base). The second pre-wired jumper 525 has open wire ends 527 at the end of the wire-pair 526 opposite that of the male connector 535. Each male connector 535 is electrically connected to the respective wire-pair 521, 526 in a polarity-correct manner, where an interlock feature 536 on each male connector 535 prevents a reverse polarity connection when the plug-in male connector 535 is connected to a plug-in female connector 127 (see FIG. 34), discussed further below. In a typical installation, the first pre-wired jumper 525 is used when the luminaire 300 is to be installed in a can-type light fixture, and the second pre-wired jumper 525 is used when the luminaire 300 is to be installed in a J-box. The pre-connected Edison base serves to simplify installation in a can-type light fixture that already has an Edison screw receptacle pre-wired in place. In a J-box retrofit arrangement, the twist-on wire connectors 510 are used to pigtail wire ends 527 of the second pre-wired jumper 525 to pre-existing wire ends in the J-box. In a J-box arrangement, the luminaire 300 may be directly secured to the J-box pre-formed mounting holes using appropriately sized hardware 515.

Figure 32:
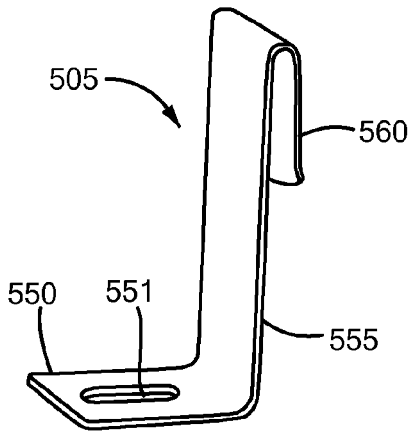
FIG. 32 depicts a formed spring included in the accessory kit of FIG. 31.
Figure 33:
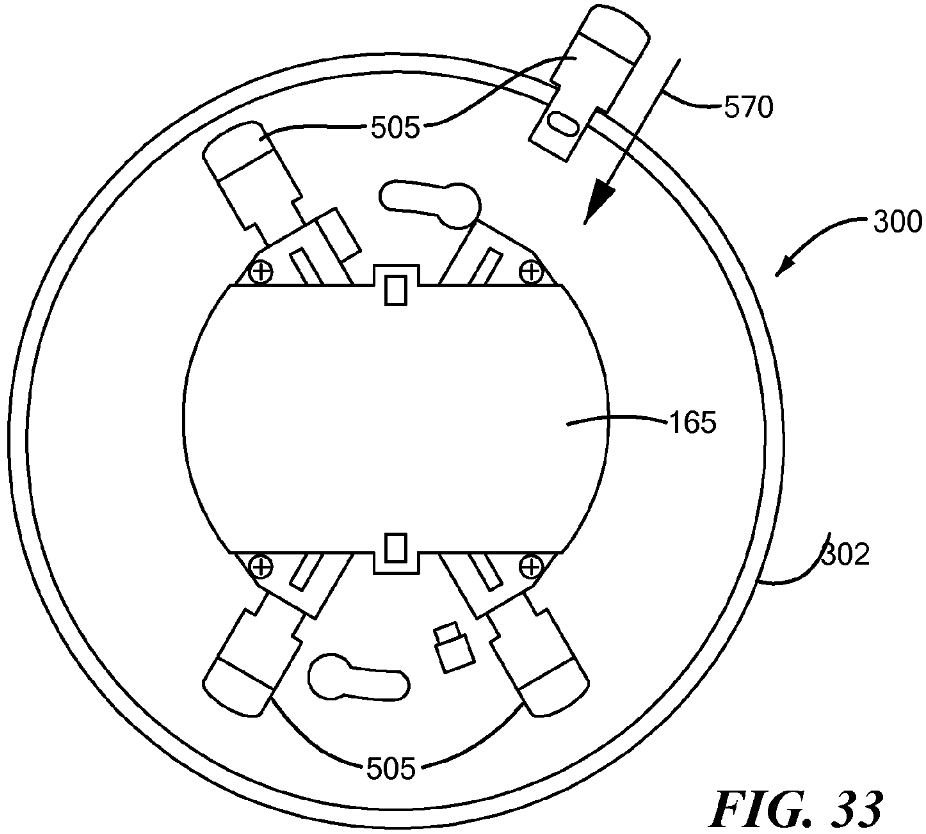
FIG. 33 depicts a top-down view of a luminaire similar to that depicted in FIG. 27, and illustrative of an assembly of a formed spring of FIG. 32 onto the luminaire.
Figure 34:
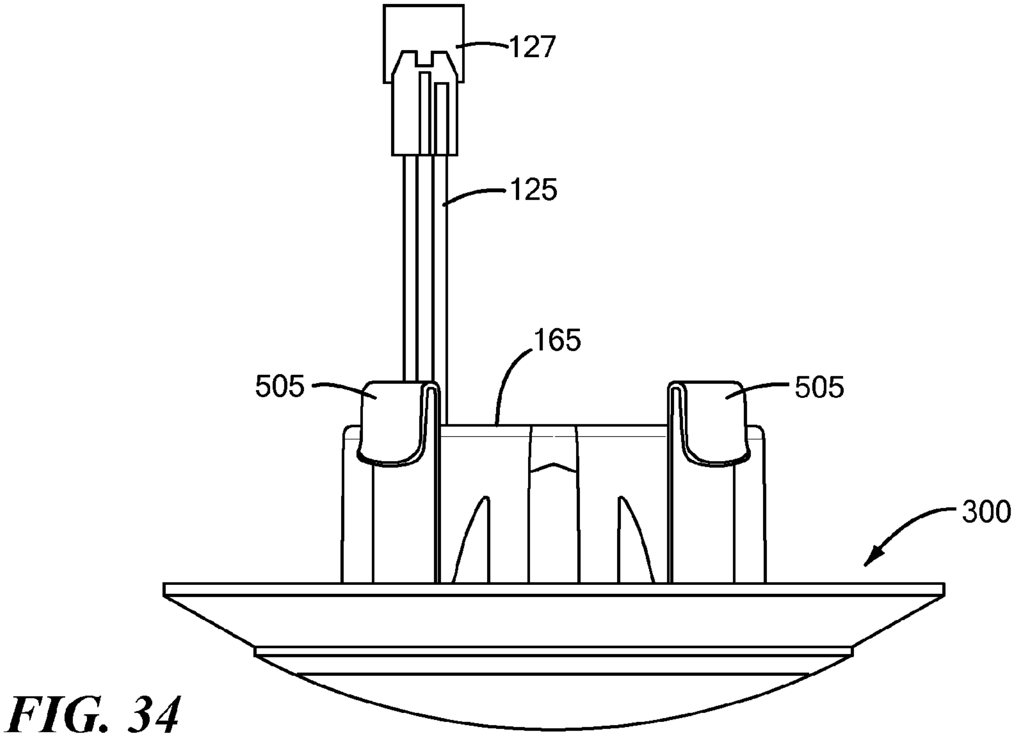
FIG. 34 depicts a side view of the luminaire of FIG. 33.

As mentioned above, securement of the luminaire 300 to a junction box may be accomplished by directly securing the luminaire 300 to a junction box using hardware 515. However, it is contemplated that the luminaire 300 may also be secured to a junction box using the plurality of formed springs 505, absent a mounting bracket 400, by attaching the springs 505 to the luminaire 300 in a manner described below, and pushing the luminaire 300 onto the J-box such that the springs deflect inward to provide a friction fit with an interior side surface of the J-box. Installation of a luminaire 300 with springs 505 onto a can-type light fixture is discussed below. In an embodiment, the formed springs 505 are formed from flat stock spring steel, best seen by referring to FIG. 32, where each spring 505 has a first portion forming an anchor portion 550, and a second portion forming both a flexible leg portion 555 and a flexible finger portion 560. With reference to FIGS. 33 and 34, each spring 505 is mechanically fixed to the luminaire 300 by pushing the spring 505 in the direction of arrow 570 such that the anchor portion 550 fits snugly with respect to the luminaire 300, and more particularly fits snugly in a friction fit manner between the power conditioner 165 and the base 302. Either the power conditioner 165 or the base 302 may have recesses appropriately sized to receive the springs 505. A projection 551 on the anchor portion 550 of each spring 505 may be used to enhance the friction fit.

FIG. 34 depicts a luminaire 300 with the set of springs 505 installed, and with the electrical supply line 125 having a first end electrically connected to, and extending outward from, the power supply 165, and having a second end, a free end or open end, electrically connected to a female plug-in connector 127 in a polarity-correct orientation. During installation into a can-type light fixture, the Edison base 540 of the first pre-wired jumper 520 is first screwed into the existing Edison screw receptacle of the can-type fixture, leaving the plug-in male connector 535 hanging out of the light fixture. The male and female connectors 535, 127 are then connected, and the luminaire 300 then pushed into and attached to the can-type light fixture such that the second portion of the springs 505 deflect slightly inward and slidably engage with an interior surface of the can-type light fixture to form a friction fit assembly inside the can-type light fixture. While an embodiment has been herein described having male and female connectors 535, 127 disposed in a particular manner and in relation to specific parts, it will be appreciated that the male and female connectors 535, 127 may be interchangeable with their respective parts, or may be replaced with another type of connector, without detracting from the scoped of the invention. As such, it will also be appreciated that the two different connectors 535, 127 may more generally be described as connectors that are configured such that one connector can electrically engage with the other connector to provide a suitable electrical connection for the purpose disclosed herein.

Figure 35:
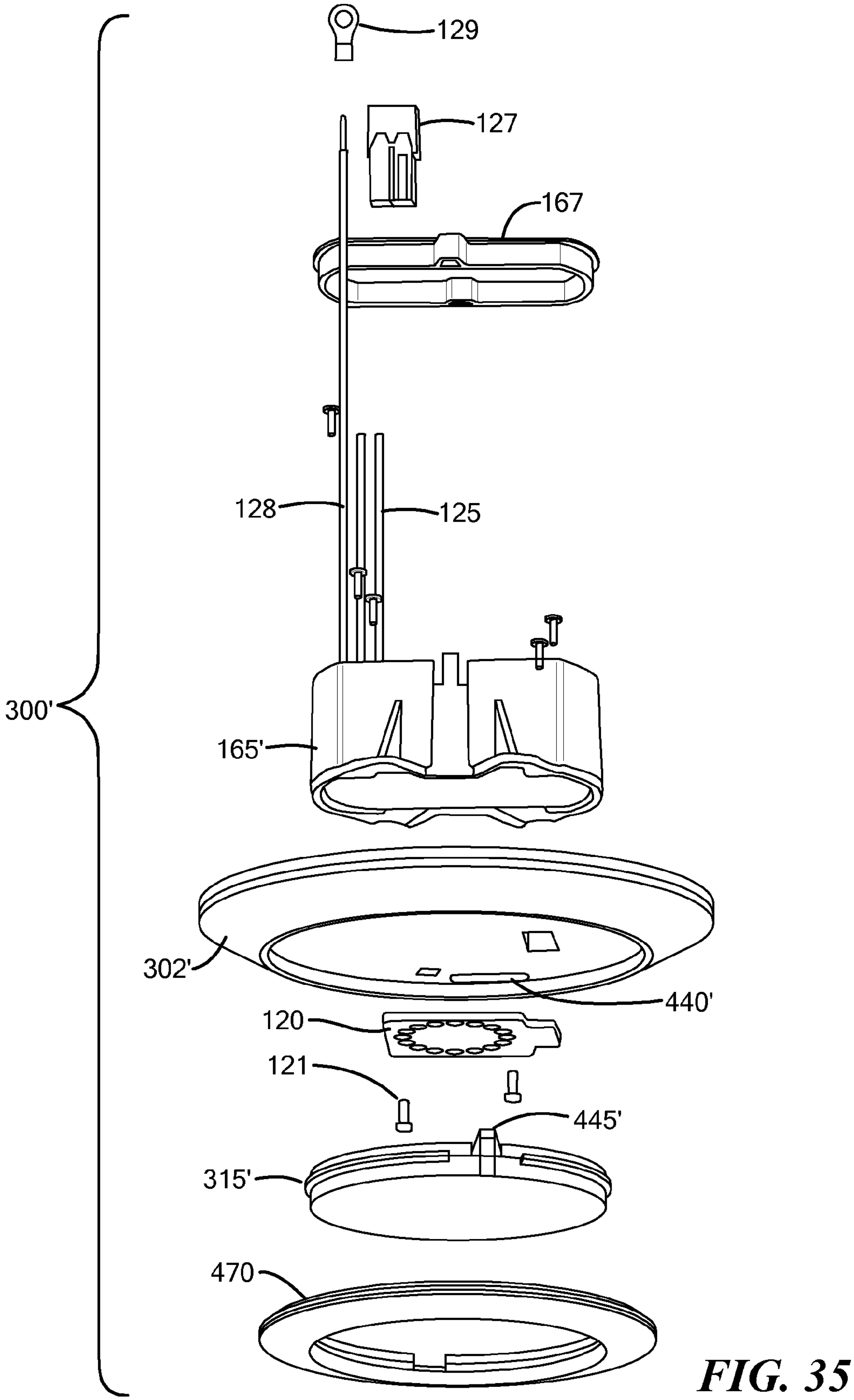
FIG. 35 depicts an exploded assembly view of the luminaire of FIGS. 33 and 34.
Figure 36A:
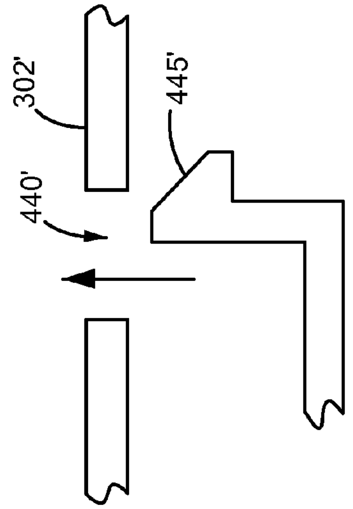
FIGS. 36A and 36B are side view depictions of a first position (not engaged) and a second position (engaged), respectively, of an engagement tab of an optic snap-fitting into an engagement opening of a base, where both the optic and the base are part of the luminaire of FIG. 35.
Figure 36B:
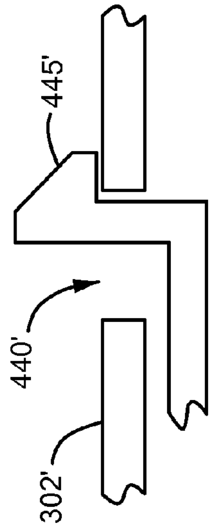
Figure 37A:
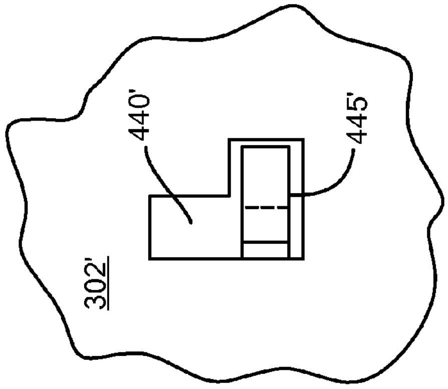
FIGS. 37A and 37B are plan view depictions of an alternative arrangement to that depicted in FIGS. 36A and 36B, respectively, and more specifically are depictions of a first position (not engaged) and a second position (engaged), respectively, of an engagement tab of an optic rotationally-fitting into an engagement opening of a base, where both the optic and the base are part of the luminaire of FIG. 35.
Figure 37B:
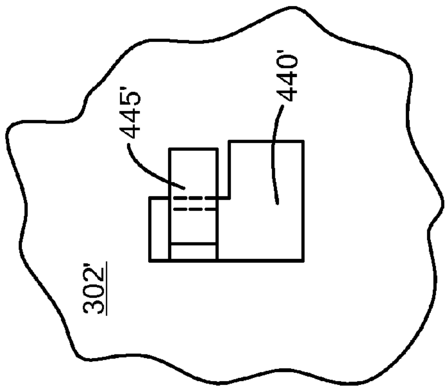

FIG. 35 depicts an exploded assembly view of another embodiment of a luminaire 300' similar to that of luminaire 300 depicted in FIG. 27, but absent the mounting bracket 400. In the embodiment of FIG. 35, the luminaire 300' includes a trim ring 470, an optic 315' having diametrically opposing engagement tabs 445' (only one illustrated), a light source 120, fasteners 121 for securing the light source 120 to a base 302', which has integrally formed and diametrically opposed engagement openings 440' (only one illustrated) configured to receive the engagement tabs 445' such that the optic 315' is secured to the base 302' by inserting the tabs 445' into the openings 440' and rotating the optic 315' relative to a cylindrical axis of the base 302' in an insert-and-rotate action from a first position to a second position such that a portion of each engagement tab 445' is securely retained by respective portions of the base 302' (best seen by referring to FIG. 36A, illustrating the tabs/openings in the first unsecured position, and FIG. 36B, illustrating the tabs/openings in the second secured position), a power source 165', an electrical supply line 125, a ground wire 128, a top 167, a female plug-in connector 127, and a ground eyelet 129. The electrical supply line 125, such as insulated two-conductor wire for example, and the ground wire 128, which may be a green color-coded insulated single-conductor wire for example, pass through holes (not illustrated) in the top 167, and subsequently have the female plug-in connector 127 and ground eyelet 129, respectfully, electrically attached thereto during factory assembly. The luminaire 300' is secured to the can-type light fixture by means of the springs 505, as depicted in FIGS. 32-34. In an alternative embodiment, the optic 315' is securely retained by the base 302' via a snap-fit engagement between the optic 315' and the base 302' created by the engagement tabs 445' snapping into engagement with a wall thickness of the base 302' as the engagement tabs 445' are pushed through the engagement openings 440' of the base 302', which is best seen with reference to FIG. 37A (illustrating the tabs/openings in a first unsecured position) and FIG. 37B (illustrating the tabs/openings in a second secured position). The ground wire 128 of the luminaire 300' may be electrically connected to the can of the can-type light fixtures using eyelet 129 and mounting hardware (short screw and washer) 515 of the accessory kit 500, or may be electrically connected to the pre-existing ground wire in the J-box by clipping off the eyelet and stripping back the wire insulation, depending of the type of installation at hand.

While certain combinations of elements have been described herein, it will be appreciated that these certain combinations are for illustration purposes only and that any combination of any of the elements disclosed herein may be employed in accordance with an embodiment of the invention. Any and all such combinations are contemplated herein and are considered within the scope of the invention disclosed.

While embodiments of the invention have been described employing aluminum as a suitable heat transfer material for the heat spreader and heat sink, it will be appreciated that the scope of the invention is not so limited, and that the invention also applies to other suitable heat transfer materials, such as copper and copper alloys, or composites impregnated with heat transfer particulates, for example, such as plastic impregnated with carbon, copper, aluminum or other suitable heat transfer material, for example.

The particular and innovative arrangement of elements disclosed herein and all in accordance with an embodiment of the invention affords numerous not insignificant technical advantages in addition to providing an entirely novel and attractive visual appearance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A luminaire, comprising:

a light source comprising a plurality of light emitting diodes (LEDs);

a heat spreader;

a substantially ring-shaped trim plate;

the heat spreader being disposed between and in thermal communication with the light source and the trim plate such that the heat spreader facilitates transfer of heat from the LEDs to the trim plate;

the trim plate being structurally configured and disposed for dissipating heat generated by the light source; and the trim plate having an outer dimension that is larger than: an opening defined by a nominally sized can light fixture; and, an opening defined by a nominally sized electrical junction box.

2. The luminaire of claim 1, wherein:

the heat spreader and the trim plate are integrally formed as a single one-piece base such that a heat flow path between the heat spreader and the trim plate is continuous and uninterrupted.

3. The luminaire of claim 1, further comprising:

a power conditioner structurally configured and disposed to receive AC voltage from an electrical supply and to provide DC voltage for the plurality of LEDs;

wherein the power conditioner is disposed, structurally configured and sized to fit at least partially within an interior space of the nominally sized can light fixture; and, the nominally sized electrical junction box.

4. The luminaire of claim 3, wherein:

the power conditioner is disposed, structurally configured and sized to fit completely within an interior space of the nominally sized can light fixture.

5. The luminaire of claim 3, wherein:

the power conditioner is disposed, structurally configured and sized to fit completely within an interior space of the nominally sized electrical junction box.

6. The luminaire of claim 3, wherein:

the power conditioner comprises an electronic circuit board having electronic components configured to receive the AC voltage from the electrical supply line and to provide the DC voltage to the plurality of LEDs.

7. The luminaire of claim 1, wherein:

the trim plate is structurally configured to be disposed completely external of the can light fixture and the electrical junction box.

8. The luminaire of claim 1, further comprising:

an outer optic disposed in optical communication with the plurality of LEDs;

wherein the trim plate and the outer optic, in combination, are structurally configured and disposed to: cover an opening defined by the nominally sized can light fixture; and, cover an opening defined by the nominally sized electrical junction box.

9. The luminaire of claim 1, wherein:

the trim plate is structurally configured and disposed to sit on an outer surface of a ceiling or a wall when the luminaire is installed in a user installation.

10. The luminaire of claim 1, further comprising:

a power conditioner structurally configured and disposed to receive AC voltage from an electrical supply and to provide DC voltage to the plurality of LEDs;

wherein the power conditioner comprises an electronic circuit board having electronic components configured to receive the AC voltage from the electrical supply line and to provide the DC voltage to the plurality of LEDs.

11. A luminaire, comprising:

a light source comprising a plurality of light emitting diodes (LEDs);

a single one-piece base comprising both a heat spreader and a substantially ring-shaped trim plate such that a heat flow path between the heat spreader and the trim plate is continuous and uninterrupted, the heat spreader being disposed between and in thermal communication with the light source and the trim plate such that the heat spreader facilitates transfer of heat from the LEDs to the trim plate, the trim plate being structurally configured and disposed for dissipating heat generated by the light source;

a power conditioner structurally configured and disposed to receive AC voltage from an electrical supply and to provide DC voltage for the plurality of LEDs, the power conditioner being disposed, structurally configured and sized to fit at least partially within an interior space of: a nominally sized can light fixture; and, a nominally sized electrical junction box.

12. The luminaire of claim 11, wherein:

the trim plate has an outer dimension that is larger than: an opening defined by the nominally sized can light fixture; and, an opening defined by the nominally sized electrical junction box.

13. The luminaire of claim 11, wherein:

the trim plate is structurally configured to be disposed completely external of the can light fixture and the electrical junction box.

14. The luminaire of claim 11, further comprising:

an outer optic disposed in optical communication with the plurality of LEDs.

15. The luminaire of claim 11, wherein:

the power conditioner is disposed, structurally configured and sized to fit completely within an interior space of the nominally sized can light fixture.

16. The luminaire of claim 11, wherein:

the power conditioner is disposed, structurally configured and sized to fit completely within an interior space of the nominally sized electrical junction box.

* * * * *